United States Patent [19]
Peterson et al.

[11] Patent Number: 5,801,687
[45] Date of Patent: Sep. 1, 1998

[54] AUTHORING TOOL COMPRISING NESTED STATE MACHINES FOR USE IN A COMPUTER SYSTEM

[75] Inventors: Alan R. Peterson, Palo Alto; James C. Spohrer, Santa Clara, both of Calif.

[73] Assignee: Apple Computer, Inc., Cupertino, Calif.

[21] Appl. No.: 719,738

[22] Filed: Sep. 25, 1996

Related U.S. Application Data

[63] Continuation of Ser. No. 316,591, Sep. 30, 1994, abandoned.

[51] Int. Cl.⁶ ........................................................ G06F 17/00
[52] U.S. Cl. ........................ 345/302; 345/440; 345/348; 345/339; 395/701
[58] Field of Search .............................. 364/488–491, 364/550; 395/140, 806–807, 348–351, 339–340, 701–704; 345/440, 302, 348–351, 339–340

[56] References Cited

U.S. PATENT DOCUMENTS

| | | | |
|---|---|---|---|
| 4,901,221 | 2/1990 | Kodosky et al. | 364/200 |
| 5,187,788 | 2/1993 | Marmelstein | 395/700 |
| 5,371,683 | 12/1994 | Fukazawa et al. | 364/489 |
| 5,394,347 | 2/1995 | Kita et al. | 364/578 |
| 5,408,597 | 4/1995 | Kita et al. | 395/140 |
| 5,481,740 | 1/1996 | Kodosky | 395/349 X |
| 5,493,642 | 2/1996 | Dunsmuir et al. | 395/349 |
| 5,542,034 | 7/1996 | Petler | 395/500 |
| 5,546,519 | 8/1996 | Berry | 395/348 X |
| 5,592,602 | 1/1997 | Edmunds et al. | 395/174 |
| 5,652,714 | 7/1997 | Peterson et al. | 364/550 |

OTHER PUBLICATIONS

Buchanan et al, "Automatic Temporal Layout Mechanisms", Proceedings of the 1st ACM Int'l Conf. on Multimedia, pp. 341–350, Aug. 1993.

Harel, David; "Statecharts: A Visual Formalism for Complex Systems"; *Science of Computer Programming*; pp. 231–274; North–Holland; 1987.

*Apple Media Tool User's Guide*; pp. 1–17; Apple Computer, Inc.; 1993.

Goodman, Danny; *The Complete Hypercard Handbook*, 2nd Edition; pp. 17–28, 341–347, 839–841; Bantam Books; 1988.

*Authorware Professional for Macintosh User's Guide*; pp. 12–67; Macromedia.

(List continued on next page.)

*Primary Examiner*—Joseph H. Feild
*Attorney, Agent, or Firm*—Helene P. Workman

[57] ABSTRACT

According to the invention, an authoring tool comprises at least one nestable graphic state and transition machine, hereinafter referred to as a "state machine", each state machine comprising one or more states and zero or more transitions, each transition interconnecting a first state, known as the "from_state", with a second state, known as the "to_state". The first and second states can be the same state or different states. For each state in the plurality of states there can be any number of transitions, including zero, emanating therefrom and directed thereto. Each state machine has a state designated as its "current state" which changes in response to users actions or other events. Each state machine also has an initial state which is the state that is designated as the current state when the multimedia title is launched. The authoring tool allows an author to view a state machine simultaneously in several different formats, providing a full view and a map view. State machines can be nested, i.e. a state machine can be contained by another state machine. Preferably, separate user and author views are provided so that an author can manipulate a multimedia product and simultaneously observe the effect such manipulation has on the multimedia product from the user's point of view. Preferably, a plurality of modes are provided, each mode being geared toward particular functionality within the invention and a mechanism is provided so that a user of the invention can selectively switch between modes.

41 Claims, 21 Drawing Sheets

OTHER PUBLICATIONS

*Learning Director for Macintosh*; Version 4; pp. 1–31; Macromedia; 1994.

Craig, John C.; *The Microsoft Visual Basic Workshop*; pp. 3–24; Microsoft Press; 1991.

"LabVIEW 2 Getting Started Manual", National Instruments, 1-1 thru 5-5, (1991).

Ichikawa et al, "Visual Programming—Toward Realization of User–Friendly Programming Environments", *Proceedings—1987 Fall Joint Computer Conference*, 1987, pp. 129–137.

Shu, Nan C., *Visual Programming*, 1988, pp. 178–188 and 300–303.

AUTHORING TOOL COMPRISING NESTED STATE MACHINES FOR USE IN A COMPUTER SYSTEM

This is a continuation of application Ser. No. 08/316,591, filed Sep. 30, 1994, abandoned

RELATED APPLICATION

This application is related to co-pending patent applications entitled "Method and Apparatus For Storing And Replaying Creation History Of MultiMedia Software Or Other Software Content", Ser. No. 08/315,726 filed on Sep. 30, 1994, now abandoned and "Method And Apparatus For Capturing Transient Events In A Multimedia Product Using An Authoring Tool On A Computer System", Ser. No. 08/316,691 filed Sep. 30, 1994, U.S. Pat. No. 5,652,714 filed concurrently herewith, which were commonly assigned or subject to an obligation of assignment to the same person at the time of invention, the disclosures of which are herein incorporated by reference.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever. In particular the claim of copyright protection extends to code and psuedocode in the Appendices and artwork in the FIGURES.

FIELD OF THE INVENTION

The invention relates generally to authoring content on a computer system and, more specifically, to an improved authoring tool for creating, manipulating and interacting with multimedia works.

GLOSSARY

"Multimedia computer" refers to an enhanced personal computer equipped to handle digitized video and/or sound data as well as traditional text and graphics data.

Definition of multimedia workstation is an enhanced multimedia computer equipped to digitize analog A/V signals into digital video and sound data, as well as being able to process them.

"Multimedia product" or "title" refers to the final software product to be consumed by general audiences.

"Authoring tool" is the software used to create or develop multimedia products.

"Multimedia author" or just "author" is the person or team of persons who creates a multimedia product or title using authoring tools.

"Tool programmer" is the software developer who develops/creates an authoring tool.

"Novice author" or "novice" or "user" is someone who uses the authoring tool to inspect the inner workings of a multimedia title.

"Audience" is the group of people for which the title is intended, who we assume has little or no desire to learn about the inner workings of the title.

BACKGROUND OF THE INVENTION

Multimedia computer software products present sounds, graphic images, animation and movies to their users in an interactive environment. Typically, users can explore and revisit different sections of the multimedia product. Usually, a multimedia product is designed so that as a user advances through the content of the product, the user navigates through information, solves puzzles, demonstrates/tests knowledge, or participates in interactive simulations.

The development of a multimedia product is typically achieved through the joint efforts of skilled artists who produce the sounds, images and animations, and skilled software authors who bind together the art, define the interactive relationships between the multimedia product and the user, and codify the behavior of the simulations and games. A software author's job is typically complex, generally entailing a relatively steep learning curve.

Software authors typically use an authoring tool to create or modify a multimedia product. Rather than requiring an exact text-based syntax as is found in a programming environment such as Apple's MPW or Symantec's Think C, authoring tools generally provide a direct-manipulation interface that allows authors to define the behavior of objects by writing a textual description in a simple scripting language, or by rearranging graphic items in a flowchart, screen map, score, or other representation. Examples of authoring tools include HyperCard, AuthorWare Professional, Macromedia Director, Visual Basic or Apple Media Tool. HyperCard and Apple Media Tool are available from Apple Computer, Inc. HyperCard and Apple are registered trademarks of Apple Computer, Inc.

AuthorWare Professional and Director are available from Macromedia and Visual Basic is available from Microsoft Corporation. Authorware Professional and MacroMedia Director are registered trademarks of Macromedia, Inc. and Visual Basic is a registered trademark of Microsoft Corporation.

In an aspect of authoring tools, software titles and content created using the tools are comprised of one or more stages where at any given time a single stage of the software title, is presented, e.g. displayed, to the end-user. Typically, as a user advances through a multimedia title, different stages are consecutively presented depending on the actions of the end-user as he/she progresses through the software title.

For example, a multimedia product might present the user with a picture containing one or more elements. As the user interacts with the elements in the picture, the elements change. For example, the picture may present a scene in which there is a dog and a cat, each in a standing position. If the user positions the cursor over the dog and depresses a mouse button, the dog smiles. If the user, repeats that action, the dog sits. The scene with the dog smiling and the scene with the dog sitting are each different states of the multimedia product.

Each element may have a unique set of behaviors associated with it. For example, a multimedia product might display a room with a dresser with a plurality of drawers, each drawer containing multiple interactive elements, e.g. games, boxes. To access the interactive elements inside the dresser's drawers, a user opens a drawer on the dresser, thereby exposing the interactive elements contained therein. The user can then interact with those elements, along with the other elements being displayed.

Usually an authoring tool is presented via a graphic metaphor. For example, in HyperCard the graphic metaphor is a stack of cards, while in Authorware Professional a flow chart metaphor is used. In MacroMedia Director a movie score graphic metaphor is used. In the above metaphors, it is typically cumbersome to implement a single screen with multiple interactive graphic elements. For example, in a stack metaphor, a separate card is typically created for each possible permutation of the display of the picture. Similarly, in a flow chart metaphor a separate graphic image is usually created for each permutation.

Typically, the number of possible permutations is a function of the number of elements and the number of possible positions for each element. Where each element has the same number of possible positions, the number of permutations is equal to $N^m$, where N equals the number of different positions for each object and m equals the number of elements. As the number of interactive elements and/or the number of possible positions increase, so too does the number of permutations.

For example, in HyperCard to implement a picture having interactive elements such as the cat and dog previously described, a card is typically created for each possible permutation. For example, if the cat and dog elements start out standing, but in response to user interaction can be individually made to smile and sit, then a card is produced for each possible permutations. In the above cat and dog example there are 9 possible permutations: the cat and dog standing, the cat standing and the dog smiling, and vice versa, the cat and dog smiling, the cat sitting and the dog smiling, and vice versa, the cat sitting and the dog standing, and vice versa, and the cat and dog sitting. Alternatively, the above can be implemented using the HyperTalk scripting language with XCMD extensions. For detailed information on HyperCard refer to "The Complete HyperCard 2.2 Handbook", fourth edition, Danny Goodman, Random House, 1993.

In MacroMedia Director, the situation in which interactive elements have behavior associated with it, an author of a multimedia title typically uses the LINGO scripting language to script the behavior of the interactive elements.

Thus, it is desirable to have a mechanism whereby authors can develop multimedia titles having interactive elements without using a scripting language and without having to implement a screen for each permutation of the multimedia title.

Some authoring tools such as AuthorWare Professional apply a flowchart model. However, these tools typically apply a linear flow and do not provide an easy mechanism for jumping to an arbitrary part of the multimedia product.

For example, in the situation where a stand-alone computer, called a "kiosk", is used to provide information on a particular topic, e.g. a museum, shopping center, store, it may be desirable to design the multimedia title to return to the beginning in certain circumstances, e.g. after a predetermined amount of inactivity has lapsed or a new user has approached the kiosk. In an authoring tool which applies a linear flow, this can be difficult to implement, especially if there are a substantial number of different screens in the multimedia title.

In some authoring tools such as the Apple Media Tool, a linear order is not imposed. In the Apple Media Tool, as shown in FIG. 1, a display area shows a diagram illustrating the relationship between the screens of a multimedia title. Each screen is represented by a screen icon in the shape of a rectangle and the operative relationship between the screens is denoted by a line with one or more arrows indicating the relationship's flow. For example, the line between screen icon 4 and screen icon 2 indicates that in operation, screen 2 may be presented immediately after screen 4. A screen can have a plurality of incoming and outgoing relationships with other screens. Screen 2 has an incoming and outgoing relationship with screen 1, an outgoing relationship with screen 3, and an incoming relationship with screen 4. The screen which follows screen 2 typically depends on the user's interaction with screen 2. In some cases, screen 1 immediately follows screen 2, while in other cases screen 3 follows screen 2.

The Apple Media Tool further includes a tool palette, as shown on the left of FIG. 1. The tool palette contains tools for creating screen icons, creating and deleting relationships between screens. A user creates a screen icon by selecting the appropriate tool and then specifies a location within the display area at which to display the new screen icon. A user creates a relationship between two screens by clicking on the appropriate tool and then specifying the two screens that are part of the relationship.

Although tools such as the Apple Media Tool allow for screens to be arbitrarily arranged, when a title is running the associated graphics are the same size for each screen, typically each graphic filling an entire display area. Thus, a screen having a plurality of interactive elements, such as the dog and cat example previously described, can not generally be created using the iconic user interface shown in FIG. 1. However, the functionality can be achieved using scripting tools.

Some tools such as Camera Man from Motion Works record the development user interaction with a computer system, but they typically record the interaction at a detailed level, such as the entire screen of each interaction. Moreover, the recording is not tied to particular objects or actions, so that it is difficult to designate replay of a subset of the recorded material where the subset is tied to a particular action, object or other specification.

In another aspect of authoring tools, authors use the tools to manipulate various types of objects and events when creating or modifying a multimedia product. For example, authors manipulate text, graphic objects such as buttons or pictures, and transient events such as sounds, video, visual effects, animations, interapplication communications and process invocations. Unlike graphic objects which are easy to manipulate graphically during authoring because they have a visual representation at runtime, transient events are not graphic or tangible at runtime and, thus, are difficult to locate and work with while authoring.

For example, consider the situation in which a graphic drawing is being displayed in a window. In particular, on a computer running System 7.5 operating system by Apple Computer Inc., a jigsaw puzzle window containing a graphic drawing can be displayed. To replace the graphic drawing, displayed in the jigsaw puzzle with another graphic drawing, a user can drag a graphic object from the Scrapbook onto the jigsaw puzzle window and drop it in the window, thereby causing the new graphic image to be displayed in the jigsaw puzzle window in place of the old graphic image. In this manner a graphic drawing of a dog in the jigsaw puzzle window can be replaced by a graphic image of a cat from the scrapbook by directly manipulating the graphic drawings.

Unlike pictures, sounds cannot be directly manipulated graphically, because they do not have a direct graphic representation. Authors can manipulate a reference to a sound, e.g. a text description of the sound, but can not directly manipulate the sound itself. For example, the text "meow" can be used as a reference to a cat sound and the text "bark" can be used as a reference to dog sound. An author can replace a bark with a meow by manipulating the text reference "meow". However, the use of a representation that is different from the true audio-nature of the sound presents several problems. First, the text may be language-specific where the sound is not. For example, the sound of a cat may be textually represented differently depending on the language. In English "meow" is used, while in Portuguese "miau" is used. Second, the text description may be inaccurate. In manipulating a text description, an author does not experience the transient event, e.g. the sound playing, so that the author could erroneously use the wrong sound, e.g. a chiwawa barking rather than a bark of a german shephard.

Authoring tools typically take one of two approaches. Some authoring tools represent a sound using a text string and allow authors to choose sounds by selecting them from a presented list of text strings. For example, a beep sound may be represented by the text string "beep" and a whistle sound may be represented by the text string "whistle". Since the sounds are not represented in the context of their use and are not in their actual representations, it can be difficult for an author to identify which sound to use. Moreover, it is sometimes difficult for an author to conceive of a name that appropriately and/or effectively describes a particular sound.

Other authoring tools assume that an author can remember where in the multimedia product a transient event is evoked. The author then traces through the code to try to determine how to reference the particular transient event. However, in situations where the code may be complex and/or is comprised of many interdependent layers, the task of tracing through code to find a particular transient event can be quite difficult. Moreover, the difficulty of the task can be further amplified if an author does not remember where in the multimedia product a transient event is evoked, thereby increasing the field of the search.

Both approaches for handling transient events are difficult for authors and for novice end-users who simply want to tweak the multimedia product.

SUMMARY OF THE INVENTION

The present invention provides a software tool such as an authoring tool for creating and/or modifying multimedia products on a computer system that addresses the foregoing limitations associated with currently existing systems, and that provides additional features which facilitate the creation and modification of multimedia products.

In an aspect of the invention, a software tool such as an authoring tool comprises at least one nestable graphic state- and transition machine, hereinafter referred to as a "state machine", each state machine comprising one or more states and zero or more transitions, each transition interconnecting a first state, known as the "from_state", with a second state, known as the "to_state". The first and second states can be the same state or different states. For each state in the plurality of states there can be any number of transitions, including zero, emanating therefrom and directed thereto. Each state machine has a state designated as its "current state" which changes in response to users actions or other events. Each state machine also has an initial state which is the state that is designated as the current state when the multimedia title or content is launched.

The software tool allows an author to view a state machine simultaneously in several different formats. In one area of the display, the authoring tool provides the user with a "full view" of the current state of the state machine, i.e. a full graphic representation of the current state. In certain situations or in response to a user's request, contemporaneous with the display of the full view, the authoring tool displays a representative map of the various states within the state machine. For example, an authoring tool can allow an author to select an arbitrary state machine from within a multimedia product and, in response to such selection, can provide a representative map of the various states within the selected state machine. Preferably, the authoring tool permits an author to view the state machine as a representative map, along with separate end-user and author views of the current state of the state machine. The authoring tool provides an interface for manipulating the representative map in order to add, delete or otherwise modify states and transitions.

State machines can be nested, i.e. a state machine can be contained by another state machine. In a situation where a first state machine contains a second state machine, the first state machine is called a "super state machine" of the second state machine and the second state machine is called a "sub-state machine" of the first state machine.

A software tool which is based upon nestable state machines facilitates the construction of transitions between states in an arbitrary, non-linear fashion. The combination of the state machine architecture with the graphic representations of the state machines and the representative map windows allows an author to create a transition between any two arbitrary states in the state machine relatively easily without being hindered by any externally-imposed linear-constraints. Moreover, this combination facilitates an author's navigation through the software title or content, thereby facilitating its development.

By allowing state machines to be nested, a software tool incorporating the first aspect of the invention provides a system which more closely maps the type of phenomena, e.g. hierarchical organization, which is likely to be modeled or represented in a software title or content. Moreover, it provides for encapsulation of graphic and interactive concepts, thereby providing a useful organizational tool for an author of a software title or content.

The nesting of state machines further provides for encapsulation within a multimedia product. Encapsulation, the grouping of objects and their functionality in a multimedia product, can be used to produce compartmentalized, robust and reusable software.

In another aspect of the invention, a software tool such as an authoring tool provides a mechanism for manipulating transient events within a multimedia product. The mechanism provides an interface for capturing transient events which is easy for an author to use and present s the author with the context and experience of the actual transient event. Using the mechanism, an author can relatively easily capture a transient event and insert it at any arbitrary location in the multimedia product. The mechanism can be used to delete transient events as well.

In yet another aspect of the invention, separate user and author views are provided so that manipulate a multimedia product and simultaneously observe the effect such manipulation has on the multimedia product from the user's point of view. Unlike an environment which provides a single view that toggles between a user mode and an edit mode, sometimes causing a user to be confused as to the current mode, the simultaneous display of a user view and an author view generally lessens or avoids such confusion.

In yet another aspect of the invention, a plurality of modes are provided, each mode being geared toward particular functionality within the invention and a mechanism is provided so that a user of the invention can selectively switch between modes. By having a plurality of modes, a multimedia product can be designed so that some modes are generally available, while other modes have restricted access. For example, in an authoring tool, user mode can be generally available, while author mode access is restricted. Such access restriction can include for example, encrypting author mode and then separately acquiring a key to unlock author mode.

These and other features of the present inventions, and the advantages offered thereby, are explained in detail hereinafter with reference to specific embodiments illustrated in the accompanying drawings.

DETAILED DESCRIPTION

Figure 1:
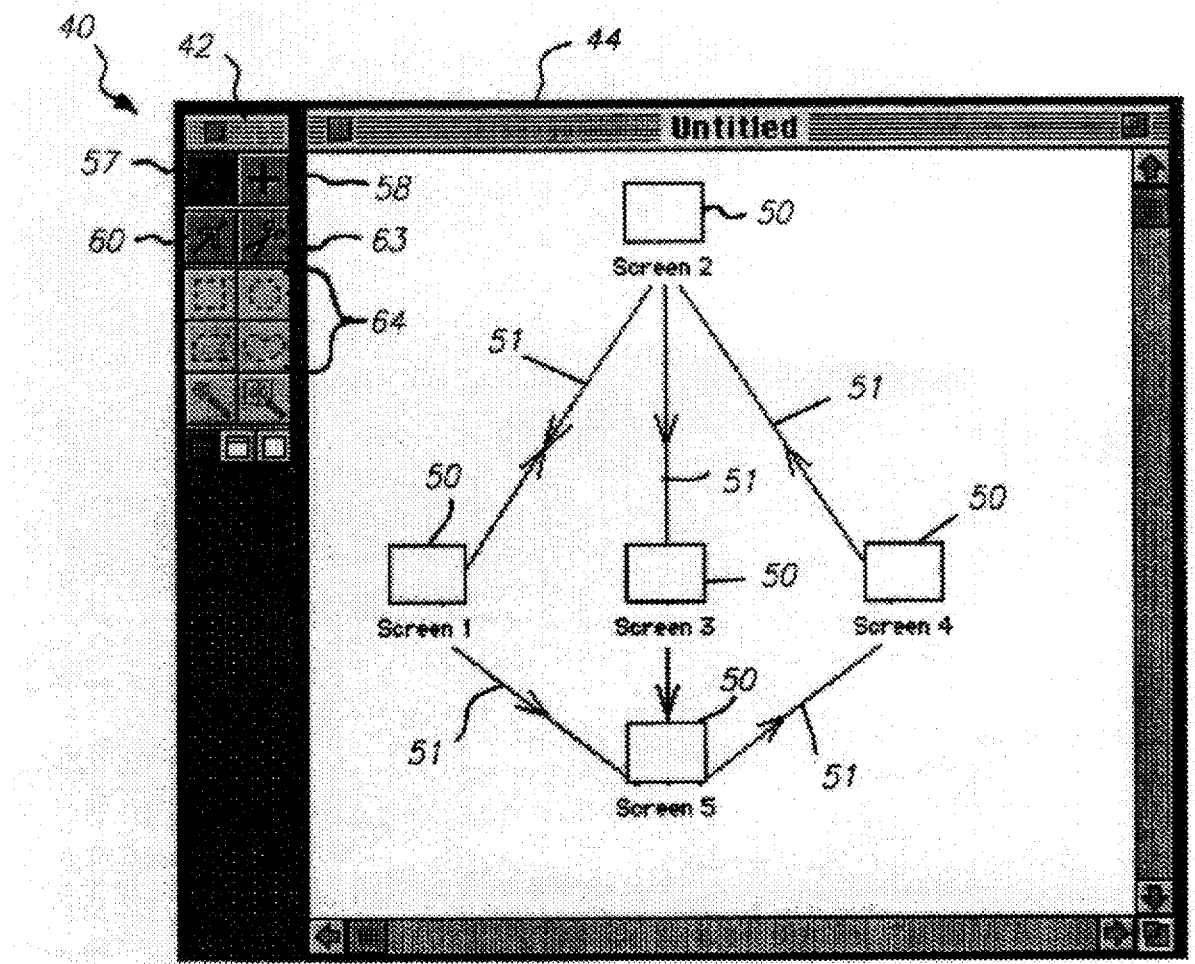
FIG. 1 generally shows a display of a prior art authoring tool.

FIG. 1 shows a display of one aspect of the user interface of the Apple Media Tool, previously discussed and herein called "AMT". As shown therein, the user interface provides a display 40 which includes a tool palette 42 and a window 44. The window 44 displays a map of the organizational path of the various stages, therein called "screens", of a multimedia product. Each screen is graphically represented in the map by a screen icon 50 shaped as a rectangle while the paths 51 between the screens are denoted by straight lines having arrows thereon indicating the flow of the path. For example, the arrow between screen 1 and screen 5 indicates that screen 5 immediately follows screen 1 in the succession of displays of the screens in the multimedia product.

The tool palette 42 includes, among other things, a selection tool 57, a screen creating tool 58, a path creating tool 60, a path deleting tool 63, and graphical object/shape tools 64. A user can create screens using the screen creating tool 58. After engaging the tool 58, the user specifies a location in the window 44 and the screen icon for the new screen is displayed at the specified location.

A user can create paths between screens using the path creating tool 60. After engaging the tool 60, the user specifies a first screen and a second screen and AMT draws a directed line from the first screen to the second screen and establishes the path. The path deleting tool 63 can be used to delete paths between screens.

As previously noted, although the AMT provides for arbitrary paths between screens and supports screens which having multiple interactive elements, such screens are implemented using a scripting language and not the screen and path user interface shown in FIG. 1.

Figure 2:
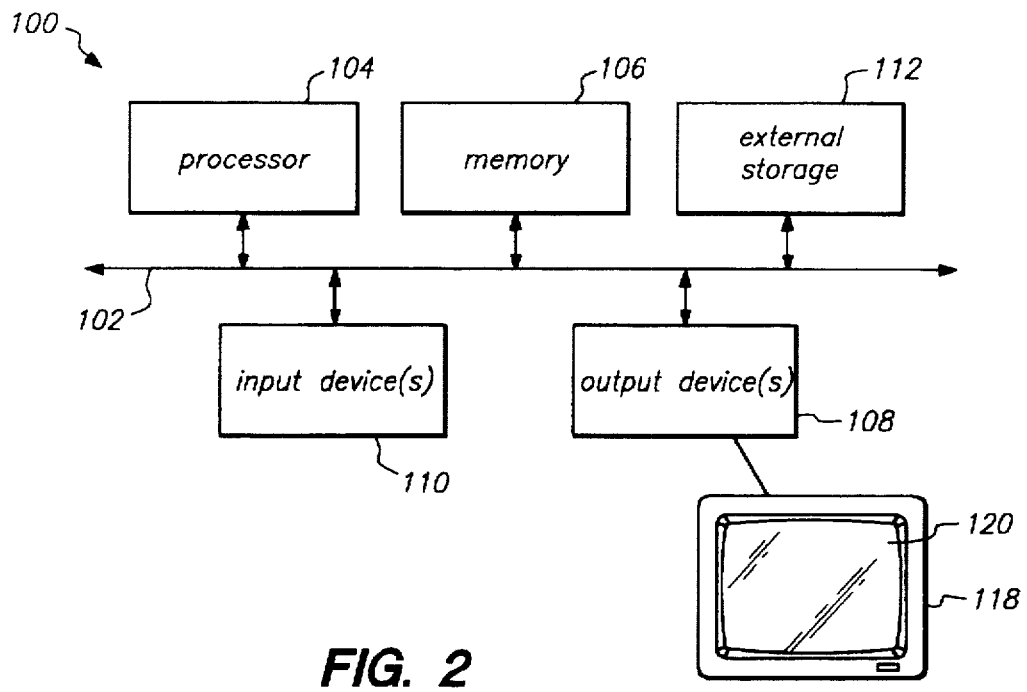
FIG. 2 generally depicts a computer system incorporating the invention.

FIG. 2 illustrates generally an example of a computer system incorporating the invention. Referring thereto, the computer system 100 comprises a bidirectional system bus 102 interconnecting a processor 104 such as a central processing unit (CPU), memory 106, one or more output devices 108 and one or more input devices 110. The memory 106 typically comprises random access memory (RAM) for temporary storage of information and/or read only memory (ROM) for permanent storage.

Optionally, the computer system includes a mass storage unit 112 such as a disk drive which is connected either directly or indirectly to the system bus 102. For descriptive purposes, the memory 106 and the mass storage unit 112 are collectively referred to as "storage" when data can be stored in any type of data storage unit.

The computer system generally includes as part of its output device(s) an audio unit such as speakers. The output device 108 is typically a conventional display monitor 118 having a display screen 120. Specifically, information, such as control and data signals, received from the connected input devices is provided via the system bus 102 to the processor 104 for processing, for storage on the mass storage unit 112 or for display on the screen 120. The display device need not be a separate display monitor, but may be housed in the same unit as the processor. For example, the computer system can be a personal digital assistant such as the Newton MessagePad by Apple Computer, Inc. where the display device is a flat liquid crystal display ("LCD") screen.

The input device 110 can be a combination of one or more input or cursor control devices such as a keyboard, a mouse, a trackball, a pen, a pen and pad combination, a touch-sensitive screen, or a sound receiving device such as a microphone.

A mouse typically contains at least one button switch operated by a user of the system. A cursor is displayed on the screen 120 and its position is controllable via the mouse or the keyboard, as is well known. An example of a mouse is shown and described in U.S. Pat. No. Re. 32,632, which patent is hereby incorporated by reference as though fully set forth herein. Herein, the terms "click" and "clicked upon" are used to describe the situation in which a cursor is positioned over an object and a mouse button or key is pressed, and, in some implementations then released.

The computer system 100 is preferably a personal computer of the Macintosh® series of computers sold by Apple® Computer, Inc., although the invention may also be practiced in the context of virtually any computer capable of displaying graphics and capable of supporting user interaction.

Figure 3:
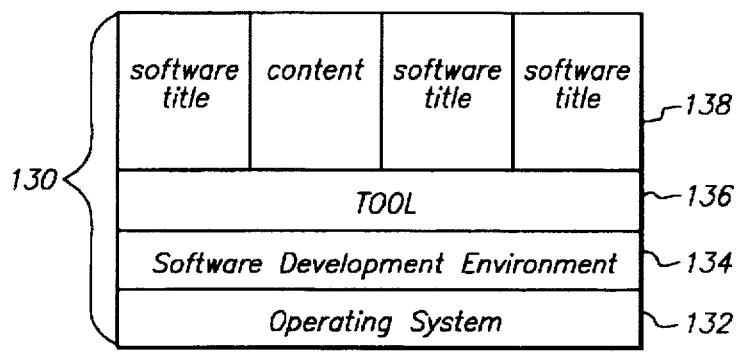
FIG. 3 illustrates software layers of a computer system incorporating the invention.

FIG. 3 illustrates generally the layers of software 130 incorporated into the computer system of FIG. 1 when the invention is incorporated into an authoring tool for multimedia products. The software 130 is arranged in FIG. 3 to reflect the dependencies between the various layers of software. A particular layer of software typically depends on the software at the layers below it and does not depend on software which is at the same layer.

The software 130 is stored in memory 106 or stored in mass storage unit 112 and then loaded into memory when executed. The software 130 includes an operating system 132 for controlling and coordinating the computer system 100. The invention can be applied to virtually any operating system, but, preferably, the operating system, in conjunction with the computer on which it is running, includes the capability to process sound, graphics, video or animation and to provide a windowing environment for display on the display screen 120 (FIG. 2). The operating system can be, for example, a System 7 operating system, developed by Apple Computer, Inc., running on an Macintosh computer such as a Quadra® 800 or a Power Macintosh® 8100, also developed by Apple Computer, Inc. For detailed information on the Apple System 7 operating system refer to the "Inside Macintosh" series published by Addison-Wesley Publishing Co., Inc., in particular "Inside Macintosh", Vol. VI, 1991.

The software further includes a software development environment 134, a tool 136 and one or more multimedia titles 138. The software development environment 134 conceptually lies between the operating system 132 and the tool 136, providing an interface between the two. The development environment 134 is typically present during the creation of the tool 136, but may or may not be present during execution of the tool, depending on the development environment.

Preferably, environment 134 is an object-oriented software development environment such as, for example, C++ or SmallTalk. The invention can be implemented in non-object-oriented software development environments by building object models within those environments. The invention can be implemented in virtually any software development environment.

With respect to object-oriented software development environment, as will be understood by those skilled in the art, object-oriented programming, herein called "OOP", techniques involve the definition, creation, use and destruction of "objects". These objects are software entities comprising data elements and routines, or functions, which manipulate the data elements. The data and related functions are treated by the software as an entity that can be created, used and deleted as if it were a single item. Together, the data and functions enable objects to model virtually any real world entity in terms of its characteristics, which can be represented by the data elements, and its behavior, which can be represented by its data manipulation functions. In this way, objects can model concrete things like people and computers, while also modeling abstract concepts like numbers or geometrical designs.

Objects are defined by created "classes" which act as templates that the program uses when constructing an actual object. A class may, for example, specify the number and type of data variables and the steps involved in the functions which manipulate the data.

The principle benefits of OOP techniques arise out of three basic principles: encapsulation, polymorphism and inheritance. More specifically, objects can be designed to hide, or encapsulate, all, or a portion of, its internal data structure and internal functions. Polymorphism is a concept which allows objects and functions which have the same overall format, but which work with different data, to function differently in order to produce consistent results. Inheritance, on the other hand, allows program developers to easily reuse pre-existing programs and to avoid creating software from scratch. The principle of inheritance allows a software developer to declare classes (and the objects which are later created from them) as related. Specifically, classes may be designated as subclasses of other base classes. The creation of a new subclass which has some of the functionality (with selective modification) of another class allows software developers to easily customize existing code to meet their particular needs.

The tool 136, typically an authoring tool for producing multimedia products, incorporates the invention. Users of the tool 136 can create, manipulate and execute multimedia products 138. Such users may be authors, novice, expert and those in-between, or end-users of multimedia products 138.

The tool 136 preferably varies the functionality it provides to a user of the tool based on a user-specified preference or the task being performed by the user. In an embodiment of the invention, a plurality of user-selectable modes are provided so that the user can specify to a certain degree the functionality provided by the tool. For example, in that embodiment, the tool 136 can provide two modes: an author mode for creating and editing a multimedia product and a user mode for simply executing a multimedia product. The two modes are provided to the user as selectable or specifiable items in the user interface of the tool 136. Examples of such selectable or specifiable items, include but are not limited to, menu items, buttons, dialog boxes, or typing a secret password.

Figure 4:
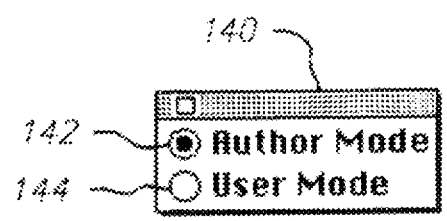
FIG. 4 shows a user interface mechanism for providing user-selectable modes in an authoring tool incorporating the invention.

An example of such selectable items is shown in FIG. 4 wherein a mode window 140 having a first radio button 142 and a second radio button 144 is displayed. A user can selectively switch modes by highlighting/clicking on either the first radio button 142 or the second radio button 144, whichever is appropriate. Preferably, the current mode is indicated by highlighting the appropriate radio button. For example, as shown in FIG. 4, the first radio button 142 is highlighted when the tool 136 is in author mode.

As is understood by a person of ordinary skill in the art, a variety of other methods can be used to present users of the tool 136 with a mechanism for selectively switching between modes.

Figure 5:
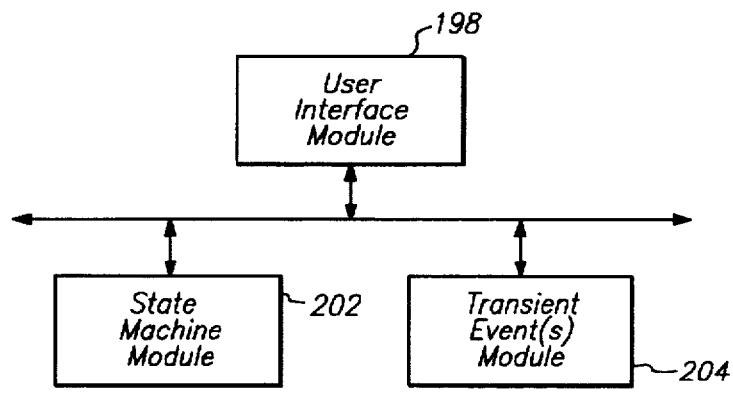
FIG. 5 illustrates generally a block diagram representing a software architecture of a tool incorporating a first aspect and/or a second aspect of the invention.

The software architecture of tool 136 conceptually comprises one or more software modules, as shown in FIG. 5. Preferably, the tool 136 includes a user interface module 198, also called "user interface means". In the first aspect of the invention, the tool 136 further includes a state machine module 202, also called "state machine means". In a second aspect of the invention, the tool 136 further includes the state machine module 202 and a transient event(s) module 204, also called "transient event(s) means". The components 198, 202 and 204 typically interoperate using a defined API and the software development environment 134 (FIG. 3) ensures correct interoperation. In some implementations, rather than being a separate module, the user interface module 198, or portions thereof, is distributed among the state machine module 202 and the transient event(s) module 204.

Figure 6:
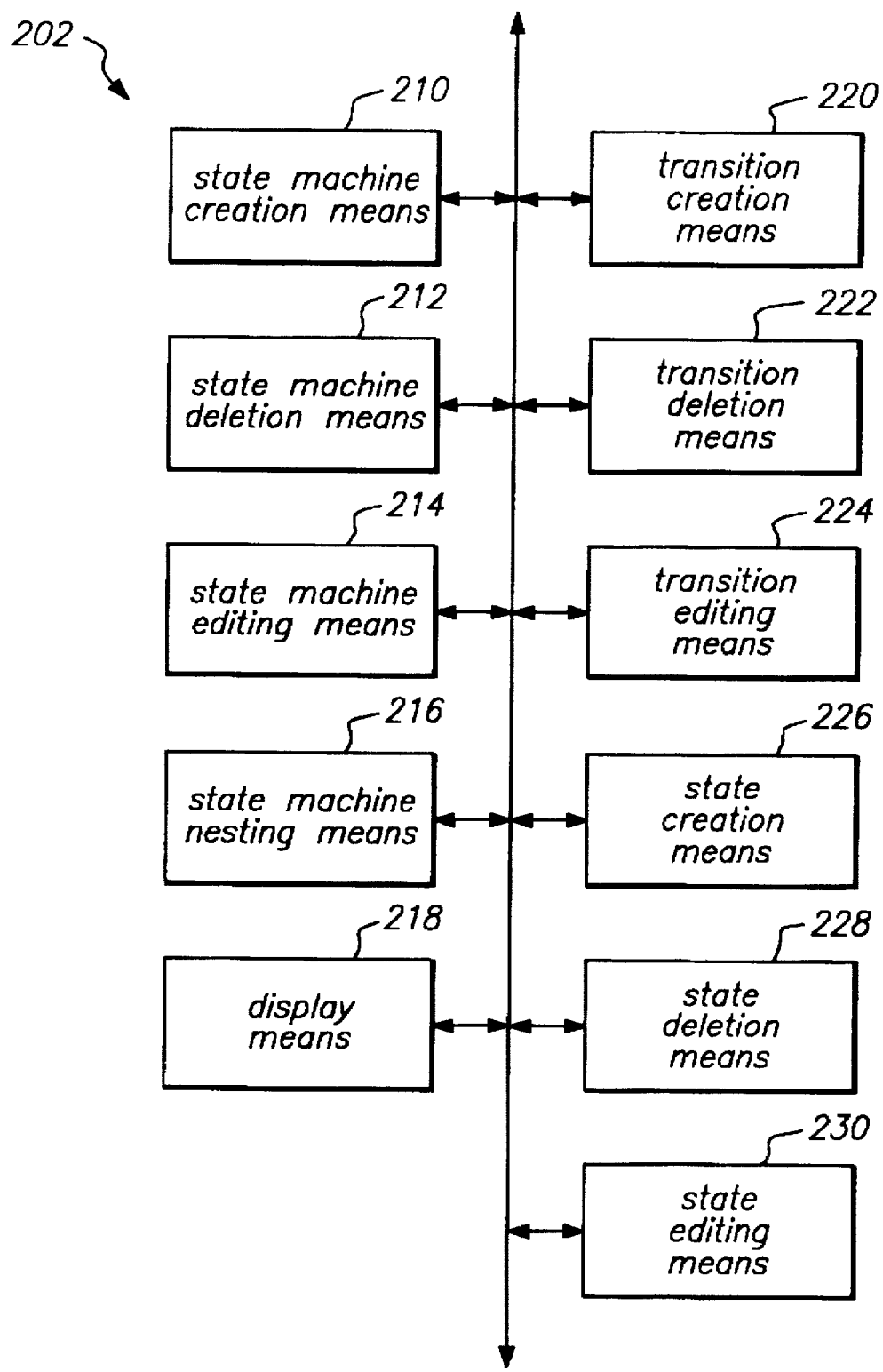
FIG. 6 depicts generally a block diagram representing a software architecture of the state machine module of FIG. 5.

The state machine module 202 creates, manipulates, deletes and provides a mechanism for nesting a plurality of state machines. As shown in FIG. 6, the state machine module conceptually comprises a state machine creation means 210 for creating a state machine, a state machine deletion means 212 for deleting a state machines, state machine editing means 214 for editing a state machine, nesting means 216 for nesting state machines, display means 218 for graphically displaying a state machine, its states and transitions, transition creation means 220 for creating a transition, transition deletion means 222 for deleting a transition, transition editing means 224 for editing a transition, state creation means 226 for creating a state, state deleting means 228 for deleting a state and a state editing means 230 for editing a state and its full view, e.g. changing the associated properties, location on a display screen, size or shape.

The state machine creation means 210 typically uses state creation means 226 to create and initialize a state machine. The state machine deletion means 212 typically uses state deleting means 228 and transition deleting means 222 to delete the states and transitions in the state machine. If the state machine being deleted is a nested state machine or if it has states which contain nested state machines, the state machine deletion means 212 may remove any references in those nested or nesting state machines which refer to the deleted state machine.

The state machine editing means 214 typically uses the state editing means 230 and the transition editing means 224, as appropriate to update the state machine. The state machine editing means 214 and the state editing means 230 each may allow, among other things, graphics to be imported.

Figure 7:
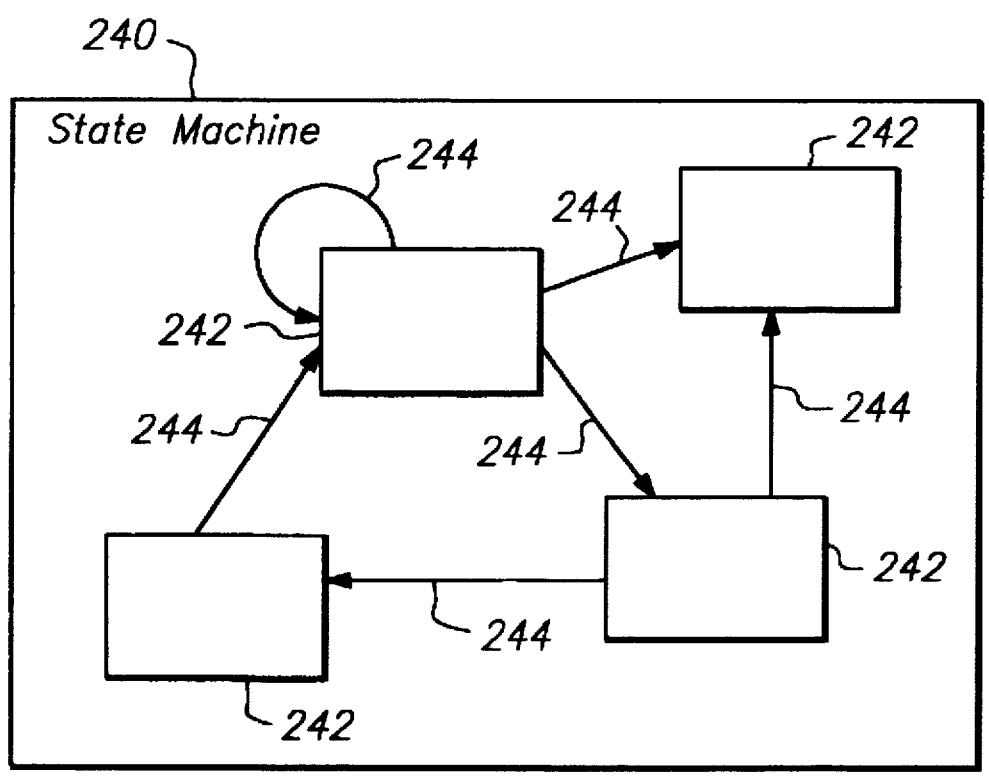
FIG. 7 shows a map of a state machine.

As shown in FIG. 7, a state machine 240 comprises a plurality of states 242 and a plurality of state transitions 244, each state transition interconnecting two states from the plurality of states. A state 242 can reference zero, one or more sub-state machines in addition to the state machine of which it is a part. Herein, the state from which a transition emanates is called the "from_state" and the state to which a transition is directed is called the "to_state." The term "current state" is used to denote the state having graphics displayed in the full view and having cursor-sensitive areas in the full view.

A transition's to_state and from_state can be the same or different states. Conceptually, a transition has a first end and a second end, the first end being coupled to the from_state and the second end being coupled to the to_state. In some embodiments, a transition may not have a first end and/or a second end because the transition is not currently part of a state machine. For example, a transition bucket can be maintained to hold transitions that have had either a to_state or from_state deleted. The transition bucket allows the transitions to be reused later.

A transition is initiated by a trigger (not shown). When a transition is triggered, the current state of the state machines transfers from the from_state of the transition to the to_state of the transition. Note that a transition can typically be triggered only when it's from_state is the same as the state machine's current state.

Examples of triggers, include, but are not limited to, time triggers, cursor triggers, keystroke(s) triggers. A time trigger is typically used to initiate a transition at a particular time or after the passing of a specified amount of time. A cursor trigger is typically used to initiate a transition upon a mouse event, such as a mouse down or a mouse up when the cursor is in a particular location on the display screen, or a mouse enter or a mouse leave event when moving the cursor to a particular location on the display screen. Mouse up and mouse down events refer, respectively, to the pressing and releasing of a mouse button. Mouse enter and mouse leave events refer, respectively, to the entering and leaving of a particular area of the display screen. A keystroke(s) trigger is usually used to initiate a transition when a specified keystroke or sequence of keystrokes is entered.

A state machine 240 can be represented by a state diagram or a state chart which depicts the various states 242 and the transitions 244 between them. State machines, transitions, state diagrams and state charts are discussed in detail in "Statecharts: A Visual Formalism For Complex Systems", by David Harel, published in Science of Computer Programming, vol. 8 no. 3, pgs 231–74 (1987), the disclosure of which is herein incorporated by reference. A state transition is defined therein as generally taking the form "when event $\alpha$ occurs in state A, if condition C is true at the time, the system transfers to state B." State diagrams are "directed graphs, with nodes denoting states and arrows (labeled with the triggering events and guarding conditions) denoting transitions." Essentially, a transition from a first state to a second state occurs in response to some type of triggering mechanism.

Typically, there is only one "current state" per state machine at any given time. For example, when state machines are nested, each state machine and sub-state machine has its own single current state.

In the first aspect of the invention, the tool 136 graphically represents one or more state machines whereby an author is simultaneously presented with a view of the current state of a state machine and an overview of the various components within the state machine. The simultaneous views allow an author to focus on the current view of a state machine, in essence an end-user's view, without losing sight of the internals of the state machine. Moreover, the overview of the various components within the state machine allows an author to easily navigate through the various components of the state machine, thereby facilitating the process wherein an author modifies the current state of the state machine.

Herein, a state's graphic representation as it appears to a user of the multimedia product is called a "full state representation" or a "full view", while the graphic representation of a state within the map window is called a "state map representation" or "map view". Preferably, the state map representation and the full state representation are distinct from each other. The full view of a state machine is an area on the display screen where the current state of the state machine is displayed.

The first aspect of the invention further provides for the nesting of state machines. In other words, inside a state machine there can be nested within to an arbitrary depth one or more other state machines, called sub-state machines. A sub_state machine is associated with a state within the super state machine, i.e. the state machine in which the sub-state machine is nested. That state is called the "containing state" of the sub-state machine. The full view of the containing state contains the full view of the sub-state machine. In some cases, a sub-state machine can have multiple super state machines.

The nesting of graphic state machines maps more closely to the types of phenomena or situations, e.g. hierarchical structures or relationships, which are likely to be represented or modeled in multimedia products. For example, consider a situation in which an author makes a working rolodex state machine and later decides to construct an "office" state machine which includes a phone, desk, intercom, copy, preferably each being a nested state machine. The author can use the invention to easily integrate the functional rolodex state machine as part of the office state machine by nesting the rolodex state machine in the office state machine. Moreover, the author can also use the invention to nest the rolodex state machine at a deeper level, such as inside a drawer of the desk. Thus, the invention provides for the nesting of state machines to an arbitrary depth.

Figure 8:
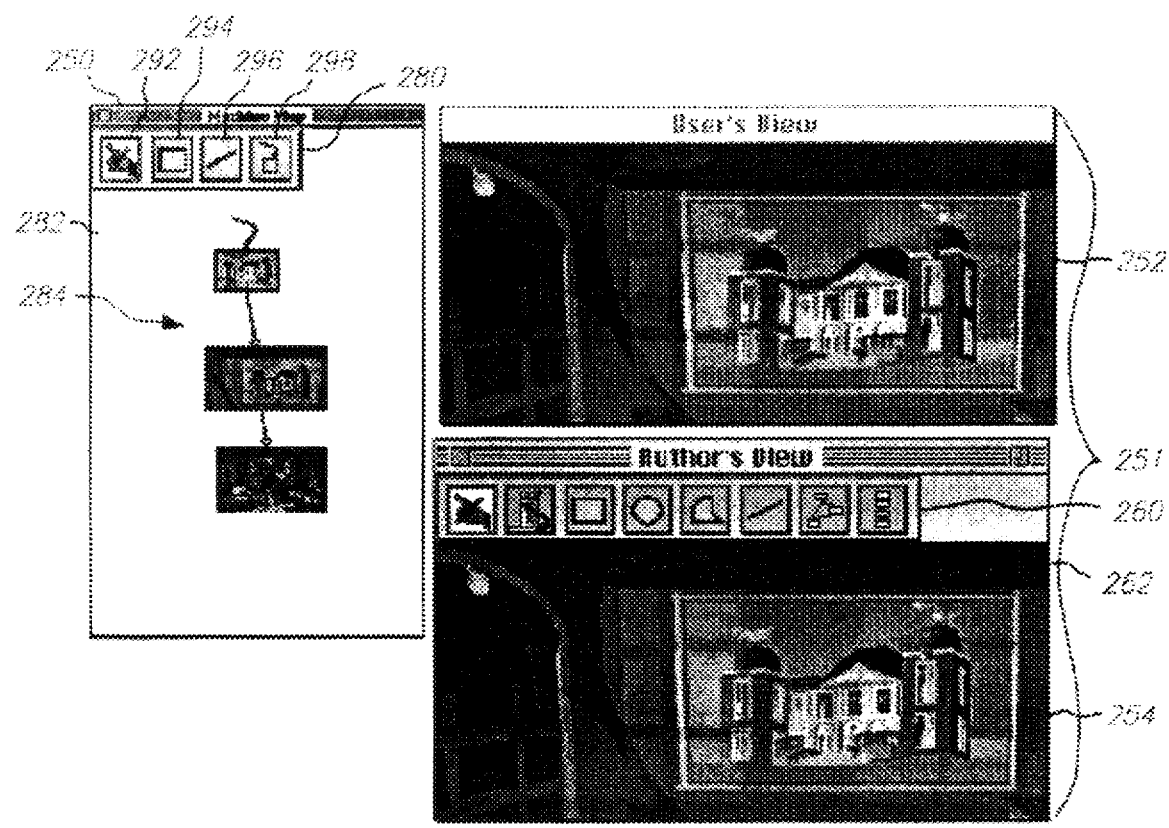
FIG. 8 illustrates generally a user interface of an authoring tool incorporating a first aspect of the invention.

As shown in FIG. 8, when the tool is in authoring mode, the user interface module 198 provides a user interface having one or more state machine map windows 250 and a full view 251, preferably consisting of a user's view window 252 and an author's view window 254.

Each graphic object is represented twice, once in each window, so that every graphic object's view in the user's view window 252 has a corresponding view in the author's window 254. When an object, e.g. a full view of the current state of a state machine, is clicked upon in the user's view window 252, the click event on the object produces a result, e.g. triggering a transition to another state of the object, as it would for an end-user of the multimedia product. For example, clicking on a button object results in the performance of the action associated with that button object. In contrast, when objects in the author's view window 254 are clicked upon, they are selected and can be manipulated without the associated action being performed. For example, a button object can be selected and moved to a different location within the author's view window 254 without the clicking of the button resulting in the action that the user would experience. Thus, in the user's window clicking an object results in the performance of the action associated with the object, while in the author's window clicking an object results in the object being selected so that an author can manipulate or modify the object. When a current state of a state machine is displayed in the author's view window and the user's view window, its full view is typically shown.

In another embodiment of the invention, separate user's view and author's view windows are not simultaneously presented on the display screen. Rather, a single view window is used to display the current mode, either user's view or author's view. When the tool is in user mode, the single view window appears and behaves in substantially the same way as the user's view window 252. Similarly, when the tool is in author mode, the single view window appears and behaves in substantially the same way as the author's view window 254.

As shown in FIG. 8, the author's view window 254 has a tool palette 260 and a display area 262, the tool palette having a plurality of tools 264 (FIG. 9) for graphically editing the full view displayed in the display area, for directing transitions and for creating new state machines.

Figure 9:
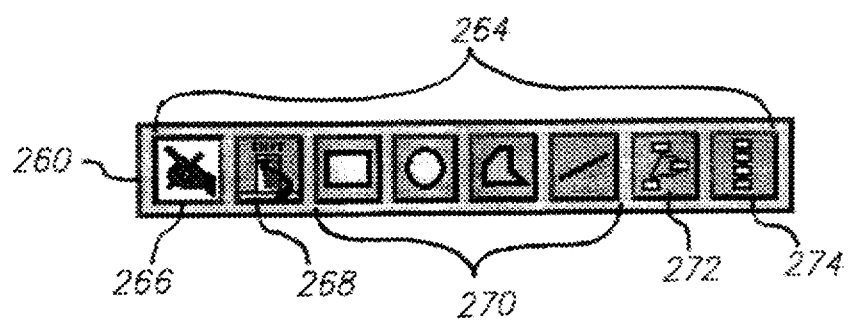
FIG. 9 depicts a tool palette for an author's view window of FIG. 8.

As shown in FIG. 9, the plurality of tools 264 preferably comprises a default selection tool 266, a target/portion tool 268, one or more graphic tools 270, a state machine creation tool 272 and, optionally, a linear state machine creation tool 274.

In general, each tool in the tool palette 260 can be selected by a user in the following manner. The cursor is positioned over the tool and the mouse button is pressed down and released. The tool palette 260 functions generally like any conventional tool palette, which is well-known in the art.

Typically, when a tool is selected/engaged, it is highlighted or otherwise delineated to provide authors/users with a visual cue as to its active status. Typically, only one tool in the tool palette is engaged at a time.

The default selection tool 266 causes the cursor to be in pointing mode. In this mode, an author can use the cursor to select or otherwise manipulate state machines or graphic objects within the full view being displayed in the display area. For example, objects or state machines can be moved, resized, deleted, or otherwise manipulated by an author.

The target/portion tool 268 allows a user to designate a portion to be a mouse trigger for a transition. When an author clicks on a full authoring view of a state, or a portion thereof, a new state and transition are created in the map view and added to the state machine. The new state and transition are arranged so that the current state is the from_state of the transition and the new state is the to_state of the transition. The designated portion is the trigger of the transition.

The graphic tools 270 are used to create new graphic objects such as rectangles, circles, straight lines and other shapes. These tools 314 are conventional graphic tools commonly found in painting or drawing programs and are well-known in the art.

The state machine creation tool 272 allows a user to create and add a state machine to the current state being displayed in the author's view window. In the preferred implementation, after selecting the state machine creation tool a user designates the location of the new state machine in the full view of the current state. The full view of the initial state of the new state machine is displayed.

The linear state machine tool 274 allows a user to specify the creation of a linear state machine. A linear state machine is one in which there is a linear flow of control between the states, i.e. each state has one and only one transition emanating from it and directed into it. A linear state machine is a more specific and restricted form of a state machine, but in some situations, an author may opt to use it. Other tools to denote other state machine arrangements besides linear can also be designated in the same fashion.

In another alternative embodiment of the invention, the tool palette 260 is replaced by one or more menus having user-selectable menu items.

In an alternative embodiment of the invention, rather than a user's view window 252 and an author's view window 254, a single window (not shown) is provided. The functionality and features provided within the single window preferably depend on the tool's current mode. In the preferred implementation, there are two modes, author mode and user mode. While in author mode, two full views are presented, an author's view and a user's view. Alternatively, author and user mode can be combined using a method and apparatus as described in co-pending and commonly assigned U.S. patent application Ser. No. 07/996/444 filed on Dec. 24, 1992, U.S. Pat. No. 5,515,496, entitled "Computer System With Direct Manipulation Interface and Method of Operating Same", the disclosure of which is herein incorporated by reference.

Referring back to FIG. 8, the state machine map window 250, herein called the "map window", provides a map representing the various states of a state machine Basically, the map window provides a map representing the various states of a state machine having its current state's full view displayed in the author's window 254, although in certain situations and implementations, the state machine being mapped in the map window can have its display in the author's window be temporarily obscured without affecting the contents of the map window. The actual state machine which is mapped in the map window depends on the embodiment of the invention, as discussed in detail below.

Typically, displays in the user's view window and the author's view window are synchronized so that as the display changes in the author's view window, the user's view window is updated to reflect those changes, and vice versa. When a user double-clicks, or otherwise indicates a particular nested state machine for editing, on a nested state machine's full view being displayed in the author's view window, the nested state machine's full view becomes visually distinct from the rest of the display in the author's view window. For example, the area of the author's view window which lies outside the full view of the nested state machine can be grayed or darkened. For an example of this refer to FIG. 11 where the area outside the thermometer state machine is darkened. Moreover, the area of the author's view window which lies outside the full view of the nested state machine becomes inactive, i.e. unable to accept user input. A double-clicking action on a nested state machine having a full view of its current state displayed in the author's window further causes the map window to display a map of that nested state machine.

The map window 250 comprises means for editing the state machine map including a mechanism for adding and deleting states and transitions and for modifying existing states and transitions, e.g. moving a transition or state. For descriptive purposes, the state machine being represented in the map window 250 is called an "active and editable state machine". An active and editable state machine may be the state machine which has a graphic representation that occupies the entire author's view or it may be a state machine which is nested therein. For example, if the state machine depicted in the author's view contains a nested state machine and that nested state machine is activated by the author, e.g. double-clicked on, the contents of the map window 250 are updated to provide a map representing the various states of the active and editable state machine. The map window allows an author to easily navigate through the various states of a state machine and to easily modify the state machine, as is discussed in further detail below.

Figure 10:
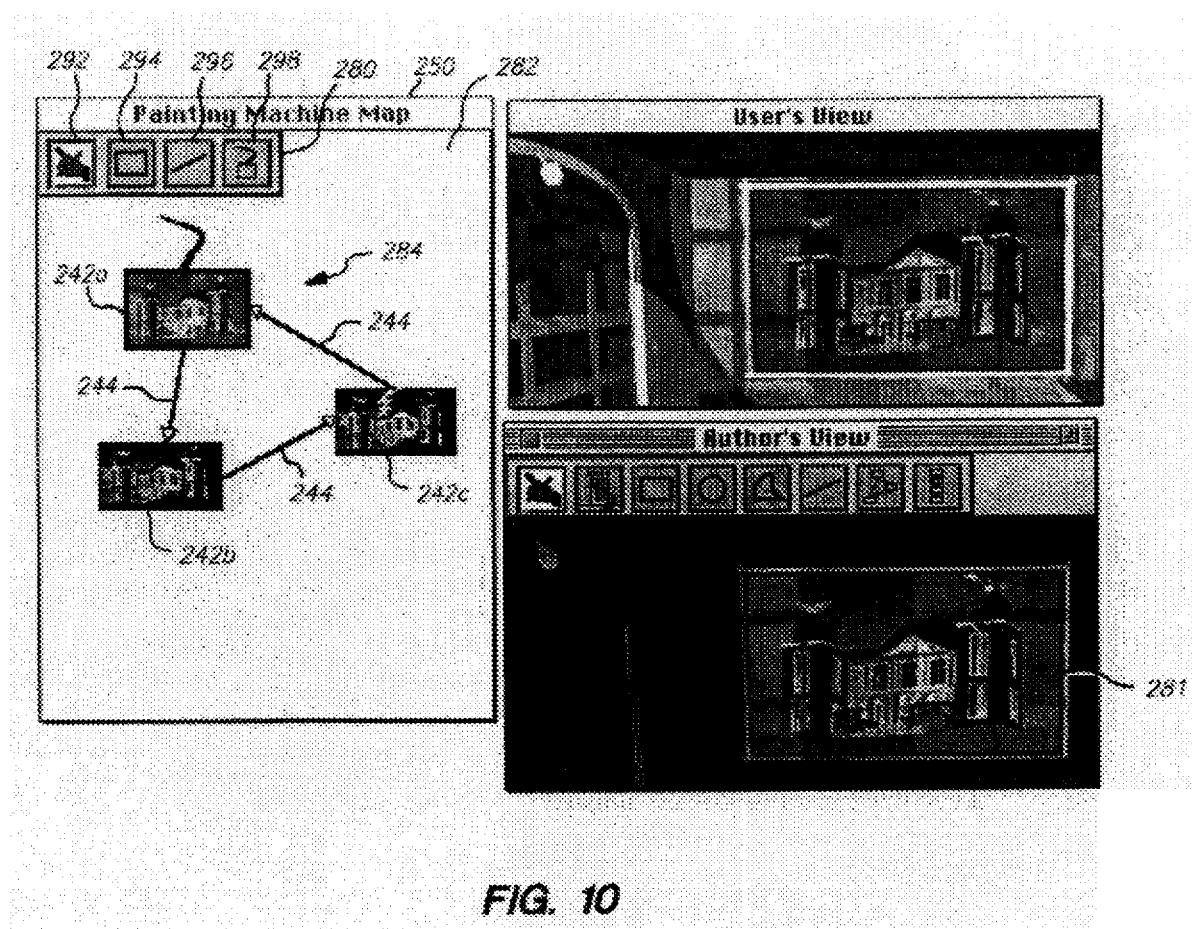
FIG. 10 illustrates a relationship between an author's view window and a map window of FIG. 8.

For example, as shown in FIG. 10, when house picture object 281 is made the new active and editable state machine, i.e. the object is activated, the map window 250 is updated to display the various states of the underlying state machine of the house picture object, i.e. the new active and editable state machine. In this example, the area in the author's view window which lies outside the active and editable state machine's full view is darkened. Other methods can be used to delineate the full view of the active and editable state machine.

When an active and editable sub-state machine's containing state ceases to be the current state of the containing state's state machine, the manner in which the full views and map views are updated depends on the particular embodiment of the invention. This situation can arise when a transition is triggered in the user's view window while a sub-state machine is active and editable in the author's view window.

In one embodiment, the map's content stays the same and the author's view window is updated so that the display area within the window is no longer user-interactive. Preferably, the non-interactiveness is graphically represented to the author, e.g. by graying or darkening the display in the author's view window. This embodiment further provides a user with a mechanism for reaching the super state machine of the state machine represented in the map window.

In this embodiment, the map in the map window can be changed by the author in the following manner. The author renavigates through the multimedia product using the user's view window until reaching the super state of the state machine being displayed. The user then double-clicks in the grayed area, thereby causing the map of the super state's state machine to be displayed in the map window.

In another embodiment of the invention, the map window is updated to show the appropriate state machine, e.g. the new active and editable state machine. Also, the display in the author's view window is updated to be synchronized with the display in the user's view window and is further updated so that the prior active and editable state machine is no longer distinguishable from the rest of the display in the author's view window. Thus, in this embodiment, the state machine which is mapped in the map window can be generalized to be the active and editable state machine, i.e. the state machine having a full view of its current state displayed in the author's view window and which is active such that the full view of the current state can be directly edited or otherwise manipulated by the user.

In either of the two embodiments described above, if a plurality of map windows 250 can be simultaneously displayed, then a map window can be displayed for each state machine having a full view of its current state being displayed in the author's view window. A state machine's map window can be displayed when the state machine's super state has its full view shown in the author's view or the display of a state machine's map window can be delayed until the user acts upon, e.g. double-clicks, the full view of the state machine's current state.

As shown in FIGS. 8 and 10, the map window 250 includes a tool palette 280 and a map display area of 282. The tool palette 280 provides a plurality of tools for authors to create, edit and delete states and transitions. The map display area 282 provides a region in which a map 284 of the editable state machine is displayed on the display screen.

The map 284 of the current state machine shows the various states 242 of the state machines as well as the transitions 244 between the states. Preferably, the map 284 includes for each state 242 a graphic representation of the state, i.e. the map view. Preferably, this graphic representation is an iconic representation or a reduction of the full graphic representation displayed in the author's window so that an author can discern from the graphic representation the context of the state. Typically, the graphic representation of the current state of the state machine shown in the map window is delineated or otherwise distinguishable from the other states of the state machine. For example, in FIG. 10, the current state, state 242a, is outlined in bold. Other mechanisms of indication include, but are not limited to, highlighting, colorizing, and flashing. Additionally, the initial state of the state machine is preferably delineated. In FIG. 10, for example, the initial state of the state machine, state 242a, has a curved line associated with it, indicating that it is the initial state.

In the map 284, transitions 244 are graphically represented using lines, curved or straight, having arrows indicating the direction of the transition. Lines with two arrows pointing in opposite directions indicate that each of the states at an end of the transition has a transition to the other state. Where there is a plurality of transitions between the same two states, rather than displaying an separate line for each transition, a single line can be displayed to represent the plurality of transitions.

The map 284 can be used by an author to easily change the current state of the active and editable state machine. Preferably, an author can designate as the current state any state within the active and editable state machine by clicking on the graphic representation of that state in the map 284. In operation, when an author clicks on a graphic representation of a state in the map 284, that state is delineated in the map as the current state and the display in the user's view window 252 and the display in the author's view window 254 are updated accordingly to show the new current state of the current state machine. Using the map window, an author can arbitrarily make any state of the current state machine the current state without being limited by external linear constraints as occurs in some authoring tools.

Typically, transitions between states are not experienced when the current state is changed using the map window. In order to experience the transition between the old current state and the new current state, an author uses the user's view window to trigger transitions from one state of the state machine to another until the desired state is reached. Alternatively, and preferably, an author uses the second aspect of the invention to experience the transition using the author's window as explained in detail below with respect to the second aspect of the invention.

The tool palette 280 preferably includes a default tool 292, a state creation tool 294, a transition creation tool 296 and, optionally, a change initial state tool 298. The tools in the tool palette 280 are selected by a user in substantially the same way as the tools of tool palette 260, previously described.

Selection of the default tool 292, also known as a "pointing" tool, allows a user to manipulate states and transitions in the map using a cursor device. A user can move states on the map, redirect transitions (change the from_state, the to_state, or both), or delete states or transitions. A state or transition can typically be deleted by clicking on the state or transition and then pressing a delete key on the keyboard or selecting a delete option from a menu. Default tool 292 functions substantially like the default tool 266.

When the state creation tool 294 is engaged/selected, a user positions the cursor at a desired location in the map 284 and presses and releases the mouse button when the cursor is at that location. A new state is created and its map view is displayed at that location in the map window.

When the transition creation tool 296 is engaged or selected, a user positions the cursor within the map window at a location within the map view of the from_state, presses the mouse button while the cursor is at that location, drags the cursor (while the mouse button is depressed) to a location within the map view of the to_state and releases the mouse button at that location.

After selecting the change initial state tool 298, a user positions the cursor within the map view of the state to be designated as the new official state and presses and releases the mouse button.

In some embodiments, a plurality of states can be consecutively created by double-clicking on the state creation button 296. In that case, until the state creation button 296 is selected again, a state is created and added to the state machine each time the mouse button is pressed down and released while the cursor is in the map window. A plurality of transitions can be consecutively created in a similar manner.

As shown in FIGS. 8 and 10, a state can have more than one transition emanating from it and directed to it. In an embodiment of the invention, illustrated in FIG. 11, a state 242 is composed of one or more portions 300 and transitions are associated with individual portions of the state. Each portion can be tied to a cursor trigger.

Figure 11:
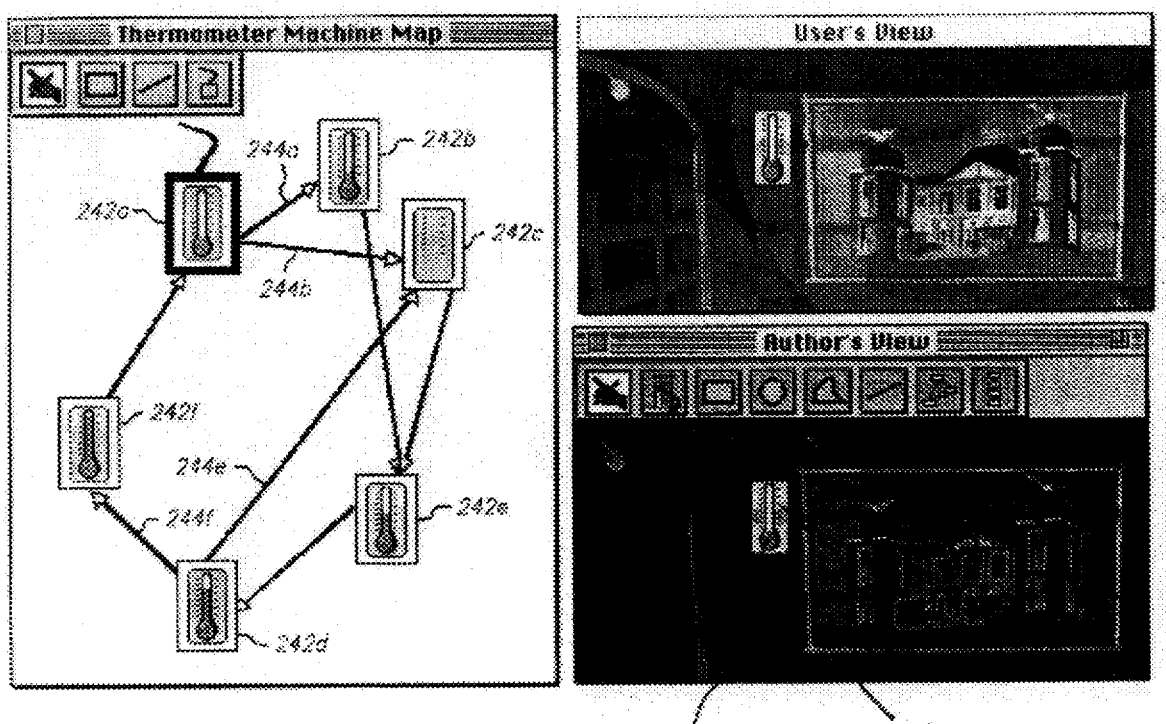
FIG. 11 generally shows transitions between states.

FIG. 11 shows an example where a full view of a state 242a is divided into two portions 300a and 300b where 300a is the area inside the thermometer and 300b is the area outside the thermometer. The portions 300a and 300b have outgoing transitions 244a and 244b respectively. If a transition trigger occurs in portion 300a, then transition 244a is triggered and state 242b becomes the current state. If a transition trigger occurs in portion 300b then transition 244b is triggered and state 242c becomes the current state.

In some cases, such as in state 242c of FIG. 11, a full view of a state is composed of a single portion which occupies the entire state. A state composed of a single portion can still have a plurality of transitions directed out from it. In that case, the transitions are distinguished from each other according to the kind of trigger which initiates the transition. For example, in state 242d, transition 244e is triggered by a mouse event, while transition 244f is triggered by a keystroke event. Thus, if the user clicks a mouse button while within the graphic representation of 242d in the user's window, then transition 244e is triggered, but if the user hits a keystroke while in that area of the display screen, then transition 244f is triggered. In an embodiment of the invention, the display of transitions in the map window can be augmented so that for each transition an icon is displayed along with the directed line, the icon indicating the type trigger.

State 242e of FIG. 11 illustrates a state having a plurality of transitions directed thereto. Thus, if a trigger occurs in either state 242b or 242c, the state 242e becomes the current state.

Figure 12:
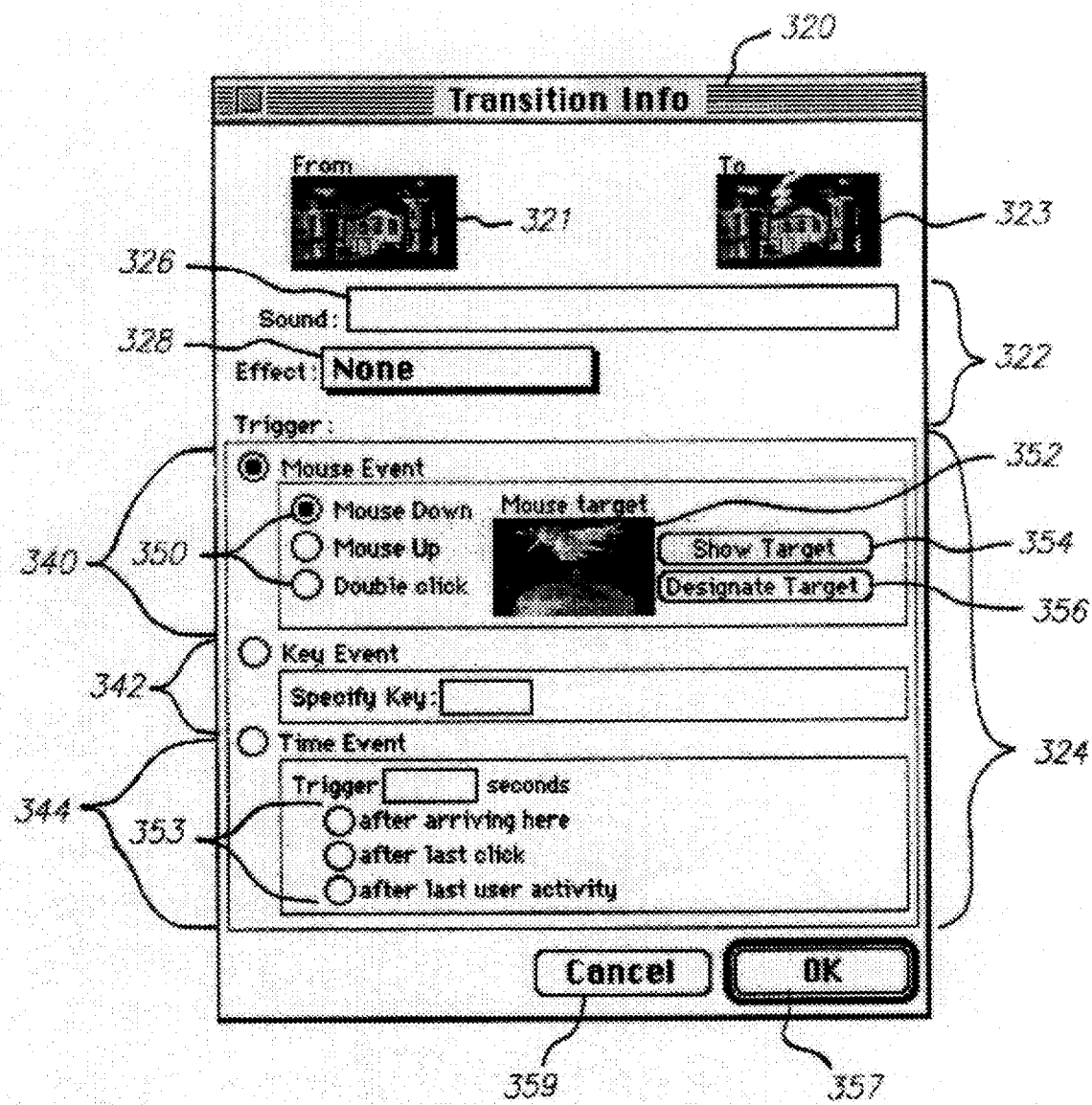
FIG. 12 illustrates a transition information window.

Transitions can be edited by an author in the following manner. Typically, the author initiates the editing by double-clicking on a particular transition being displayed in the map window, thereby causing a transition information window 320 to be displayed, as shown in FIG. 12. Additionally, an author can edit the from_state and/or the to_state of a transition by manipulating the endpoints of the graphical representation of the transition in the map window. For example, an author can drag an endpoint of a transition from one state of the state machine to another state of the state machine, thereby changing the to_state of the transition.

The transition information window 320 displays to the user information associated with the particular transition specified by the user, e.g. double-clicked upon. Such information includes, but is not limited to, the transient events and the type of trigger(s) associated with the transition.

The transition information window 320 of FIG. 12 is divided into several information areas, the transient events area 322 and the trigger area 324. Preferably, the transition information window 320 displays the current from_state and to_state of the transition, as shown in the top portion of the transition information window. as from_state area 321 and to_state area 323, respectively. Optionally, each area 321 and 323 is dynamic and allows a user to change the from_state or to_state by cycling through the states of the state machine. For example, a user can cycle through the states by clicking on the area 321 or 323, each click causing the map view of the next state in the state machine to be displayed in the area and to be set as the from_state or to_state, accordingly.

The transient events area 322 may include a sound field 326 and a visual effect(s) field 328. The sound field 326 specifies which sound(s), if any, are associated with the particular transition. The visual effect(s) field 328 specifies which special effect(s), if any, are associated with the particular transition. Special effects include, but are not limited to, visual effects such as dissolving or wiping. In dissolving, the full view of the from_state is dissolved into the full view of the to_state. The sound(s) and visual effect(s) associated with a transition are presented to the author/user when the transition's trigger occurs in user mode.

The trigger area 324 specifies the kind of trigger(s) associated with the transition. The trigger area 324 includes, for example, a mouse event field 340, a key event field 342 and a time event field 344. The mouse event field 340 specifies which mouse events, if any, are triggers for the transition and, preferably, provides mechanisms for designating to_states of the transition. The mouse event field 340 comprises a mouse event designation 350, a mouse target 352, a show target 354 and a designate target 356.

In this particular example, the mouse event designation 350 indicates a mouse down mouse event trigger is associated with the transition, as indicated by the highlighted buttons in the mouse event field.

The mouse target 352 indicates the location of the trigger. If the trigger occupies an entire state, then the map representation of the entire state is shown. If the trigger occupies a portion of a state, then the portion is indicated. Either that portion is shown alone or the portion is shown in the context of the entire state and the portion is highlighted or otherwise made distinguishable.

The time event field 344 includes a time event designation 353. In this particular example, the time event designation indicates that the trigger consists of a particular amount of time and a context X in which the time lapses. The time event field 344 specifies whether a time trigger is associated as a trigger of the particular transition. The time event field 344 can specify a particular time or an interval of time and allow an author to change the time value. For example, the time event field can contain a text field (not shown) which a user can manipulate to change the time or interval of time.

The show target 354 temporarily sets the current state to the state containing the portion specified in the mouse target 352 providing a view of the trigger's context in the full view in the user's view. Preferably, the show target 354 is activated when a user clicks on it and remains active until the mouse button is released. Preferably, a cue is provided while the show target 354 is active, e.g. the trigger's portion in the full view flashes.

The designate target 356 allows an author to change the transition trigger's mouse-sensitive portion of a state's full view. When an author clicks on the designate target 356, the target/portion tool 268 (FIG. 9) is activated in the author's view window. Typically, the tool 268 is highlighted to show its active status. In an embodiment of the invention, the first location within the current from_state of the transition which is clicked on by the author in the author's view window becomes the new mouse-sensitive portion.

The key event field 342 specifies whether a keystroke or sequence of keystrokes is associated as a trigger of the particular transition. The key event field can specify which keystroke(s) serve as the trigger and provides a mechanism which allows an author to change the keystroke(s). For example, the key event field 342 can include a text field (not shown).

The transition information window 320 also includes, in this example, an OK button 357 for exiting the transition information window 320 and indicating that the changes are to be entered, and a CANCEL button 359 for exiting the transition information window 320 without editing the transition.

Figure 13:
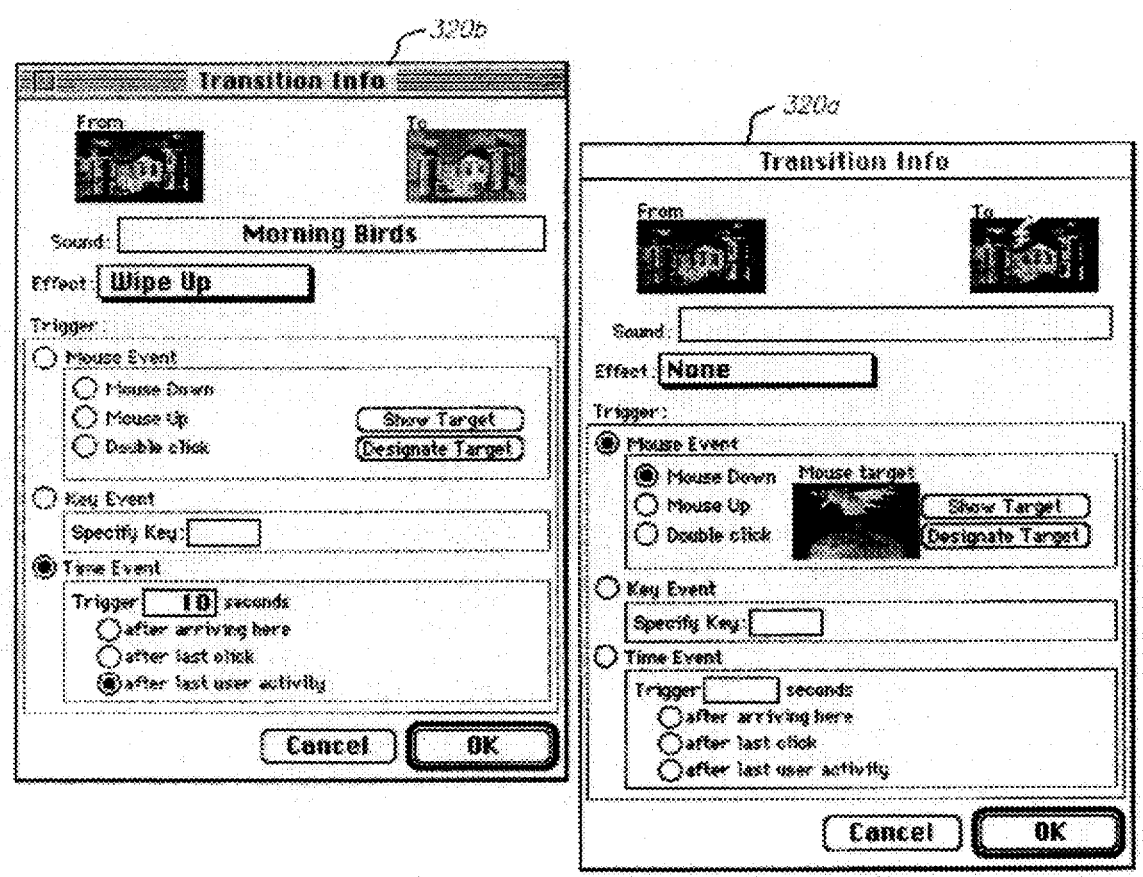
FIG. 13 generally depicts a transfer of information from a first transition window to a second transition window.

In an embodiment of the invention, as shown in FIG. 13, a plurality of transition information windows 320 can be displayed simultaneously. In this embodiment, when a user "drags" information from a first transition window and "drops" it onto a second transition window, the dragged information is incorporated into the information associated with the transition of the second transition window. The "drag and drop" terminology is used herein to denote positioning a cursor over a displayed object, pressing the mouse button, moving the cursor (keeping the button depressed) to a new location and releasing the mouse button while the cursor is at that new location.

For example, the sound associated with a first transition having information displayed in transition information window 320a can be changed to the sound specified in the second transition information window 320b by dragging the text object "Morning Birds" from the second window to the first window and dropping it on the first window. After the Morning Birds object is dropped on the first window, the sound field 326 is updated to show that the Morning Birds is associated with the first transition and data structures are updated to reflect the change.

Figure 14:
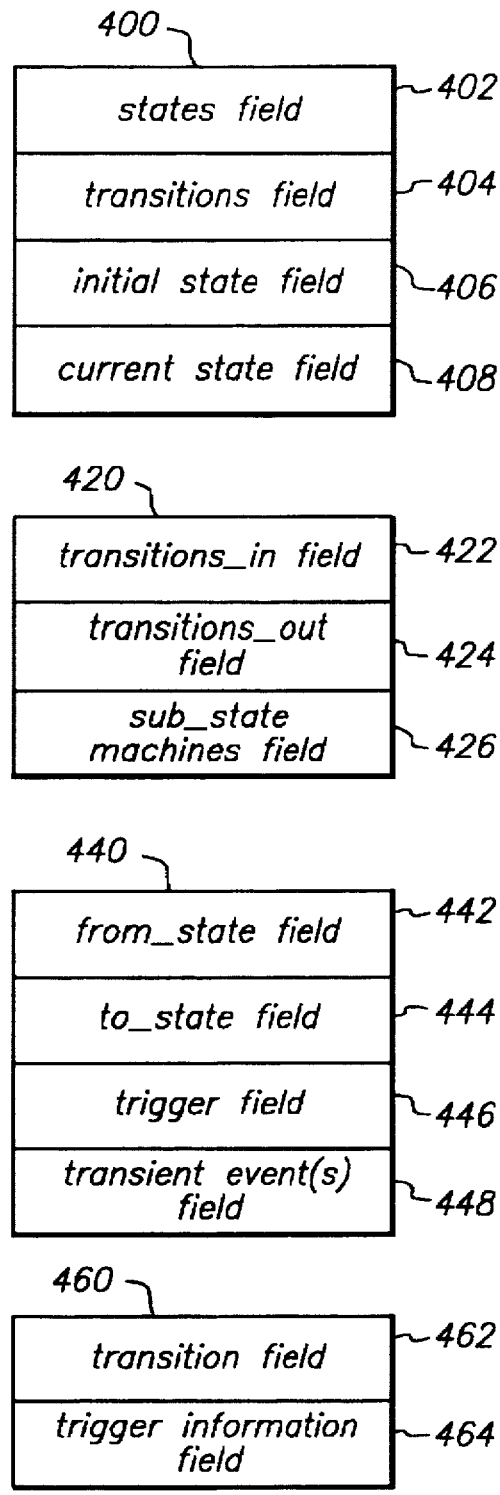
FIG. 14 shows data structures associated with state machines, states, transitions and triggers.

FIG. 14 depicts generally the kind of data contained within data structures representing a state machine 240, a state 242 and a state transition 244 of FIG. 7. For descriptive purposes the terms "specify", "identify" and "reference" are used interchangeably and encompass both direct and indirect methods. The Appendix includes samples of these data structures. The samples are written in the C programming language.

As shown therein, a state machine 240 generally has an associated state machine data structure 400 which includes a states field 402, a transitions field 404, an initial state field 406 and a current state field 408. The states field 402 references essentially all of the states 242 in the state machine 240. Basically, the states field 402 identifies each state 242 in the state machine 240. For example, the states field 402 can contain a pointer to the data structure for each state 242 in the state machine 240.

Similarly, the transitions field 404 references essentially all of the transitions 244 in the state machine 240. Basically, the transitions field 404 identifies each transition 244 in the state machine 240. The initial state field 406 specifies the starting state of the state machine 240. The current state field 408 specifies the state 242 in which the state machine 240 is currently being displayed in the user's view window 252 (FIG. 8).

As further shown in FIG. 14, a state 242 usually has an associated state data structure 420 which includes a transitions_in field 422, a transitions_out field 424 and a sub-state machines field 426. The transitions_in field 422 references the transitions into the state 242 from another state. Similarly, the transitions_out field 424 references the transitions directed out of the state 242 into another state. The sub-state machines field 426 indicates what state machines, if any, are referenced by the state 242. In other words, the sub-state machines field 426 specifies the nested state machines, if any. For example, if the state has nested state machines, then the substate machines field 426 contains a reference, e.g. pointer, to a state machine data structure 400 for each nested state machine.

A transition 244 typically has an associated transition data structure 440 which includes a from_state field 442, a to_state field 444, a trigger identification field 446 and, optionally, transient event(s) field 448. The from_state field 442 specifies the state 242 from which the transition is originating and the to_state field 444 indicates the state to which the transition is being made. The trigger identification field 446 specifies a trigger for the transition.

The transient event(s) field 448 indicates which transient event(s), if any, should occur during the transition from the from_state to the to_state referenced in the from_state field 442 and the to_state field 444, respectively.

As further shown in FIG. 14, a trigger usually has an associated trigger data structure 460 which includes a transition identification field 462 and a trigger information field 464. The transition identification field 462 specifies the transition 244 which is initiated by the trigger. The trigger information field 464 specifies information which is specific to the particular trigger. For example, if the trigger is a time trigger then the trigger information field 464 typically includes either a time or an amount of time, depending on the type of time trigger.

Figure 15A:
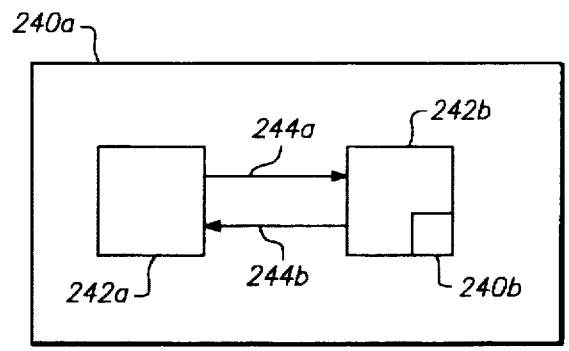
FIGS. 15A and 15B illustrate an example of a state machine and its underlying data structures.
Figure 15B:
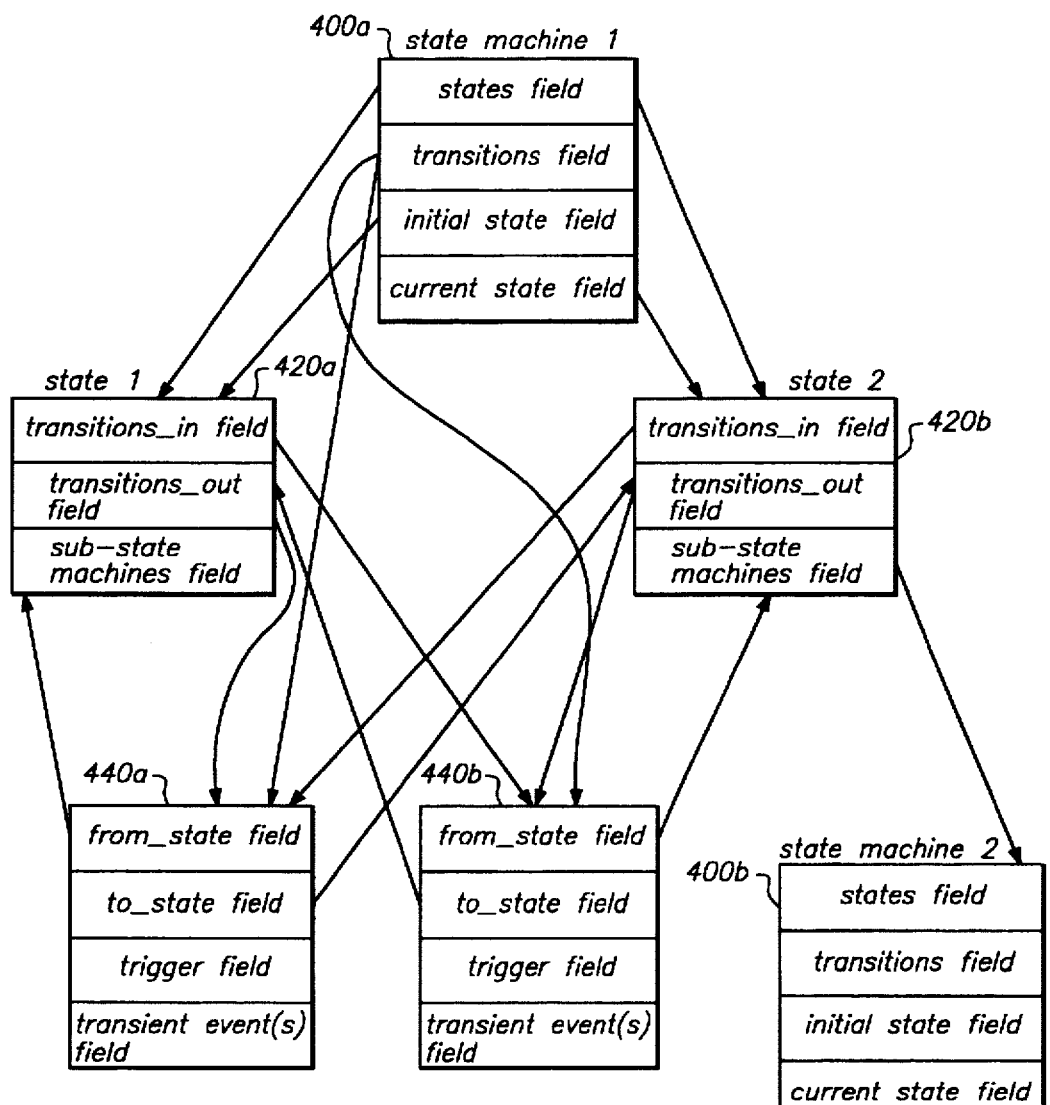

FIGS. 15A and 15B illustrate generally nested state machines and the relationship of the data structures of FIG. 14. FIG. 15A is a map 284 (FIG. 8) showing a state machine 240a having two states 242a and 242b, wherein state 242b also contains a state machine 240b having two states (not shown). Transition 244a is triggered by trigger1 (not shown) and transition 244b is triggered by trigger2 (not shown).

FIG. 15B shows the relationship of the data structures for the state machines, states, transitions and triggers of FIG. 15A. The data structure 400a associated with the state machine 240a references data structures 420a and 420b for states 242a and 242b, respectively, and data structures 440a and 440b for transitions 244a and 244b, respectively. The data structure 400a further specifies state 242a as the initial state and 242b as the current state. The data structure 420a specifies transition 244b as the transition into the state and transition 242a as the transition out of the state. The data structure 420b specifies transition 244a as the transition into the state and transition 242b as the transition out of the state. The data structure 420b also specifies the state machine 240b as the substate machine. The data structure 440a specifies state 242a as the from_state and state 242b as the to_state. The data structure 440b specifies state 242b as the from_state and state 242a as the to_state. Triggers and transient event(s) are not shown in FIG. 15B. Nor are the data values for data structure 400b provided.

FIGS. 16–19 are flowcharts generally depicting the operation of an authoring tool incorporating the invention. These steps are typically performed in response to a user-specified event or input. Examples of user-specified events include, but are not limited to, selection of a tool from the tool palettes 260 (FIG. 9) or 280 (FIG. 8), clicking on an object or state machine in the author's view window or map window, and double-clicking on a transition.

At block 500 it is determined whether a user-specified or other event has occurred. If so, then at block 502, it is determined in which kind of window the event occurred. If the event occurred in a full view window such as a user's view window or an author's view window, then control flows to block 504. On the other hand, if the event occurred in a map view window, i.e. map window, then control flows to block 550 of FIG. 17.

At block 504, the mode of the authoring tool is determined. If the authoring tool is in authoring mode, then control flows to block 700 of FIG. 19. If the authoring tool is in user mode, then at block 506 it is determined whether a trigger occurred. If a trigger occurred, then control flows to block 508; otherwise, control flows back to block 500.

At block 508, it is determined whether the from_state equals the current state. If the two states are the same, the trigger is caused to occur. When a trigger occurs, the transient events associated with the indicated transition are performed, the to_state of the associated transition becomes the current state and the map window, author's view window and user's view window are updated accordingly.

In some embodiments, the tool can be designed so that triggers only fire when the trigger's from_state is the current state of the state machine. In that case, the check performed at block 508 can be omitted.

Figure 16:
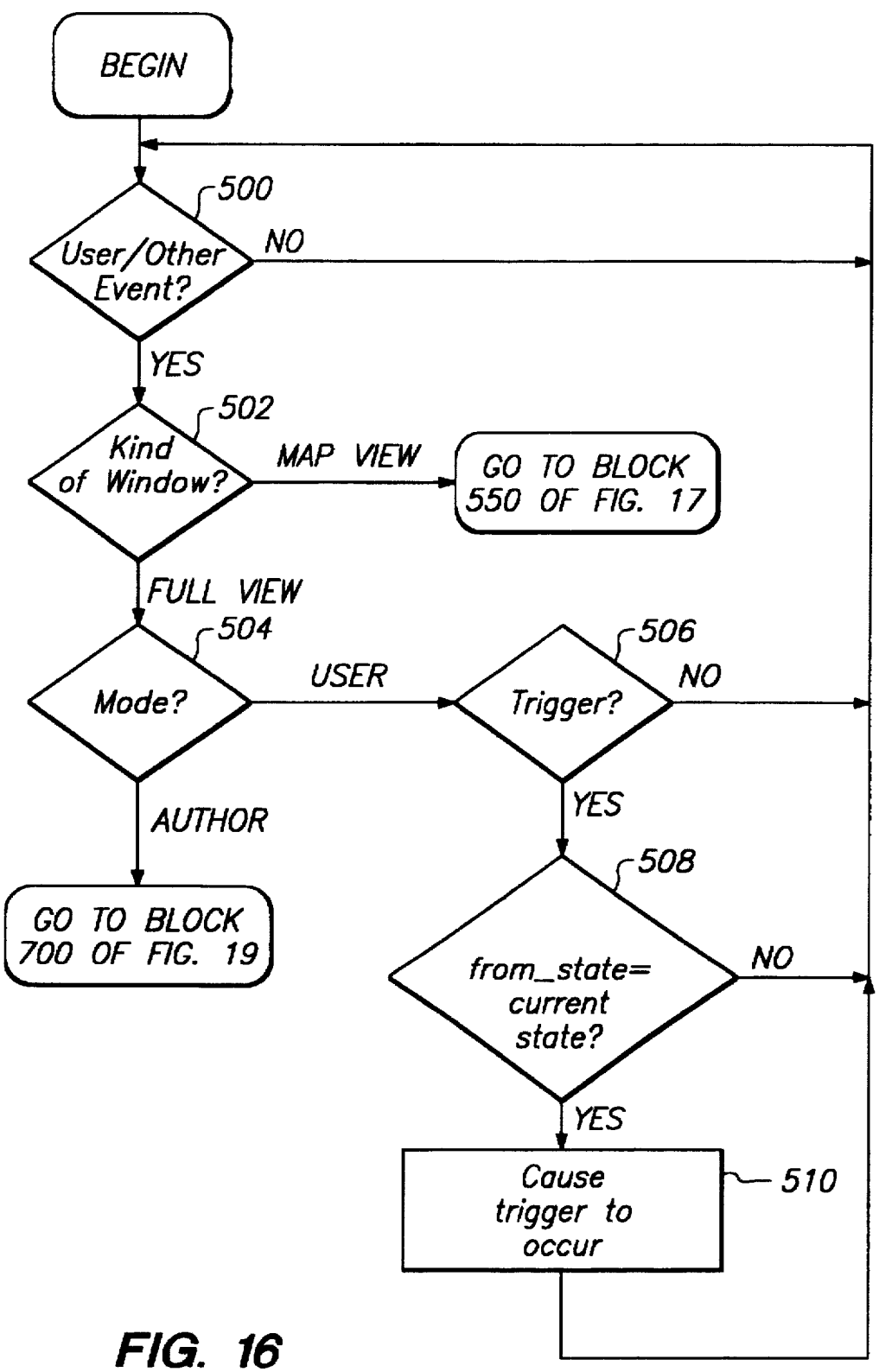
FIGS. 16–19 are flow charts generally depicting the steps performed in the operation of an authoring tool incorporating the invention.
Figure 17:
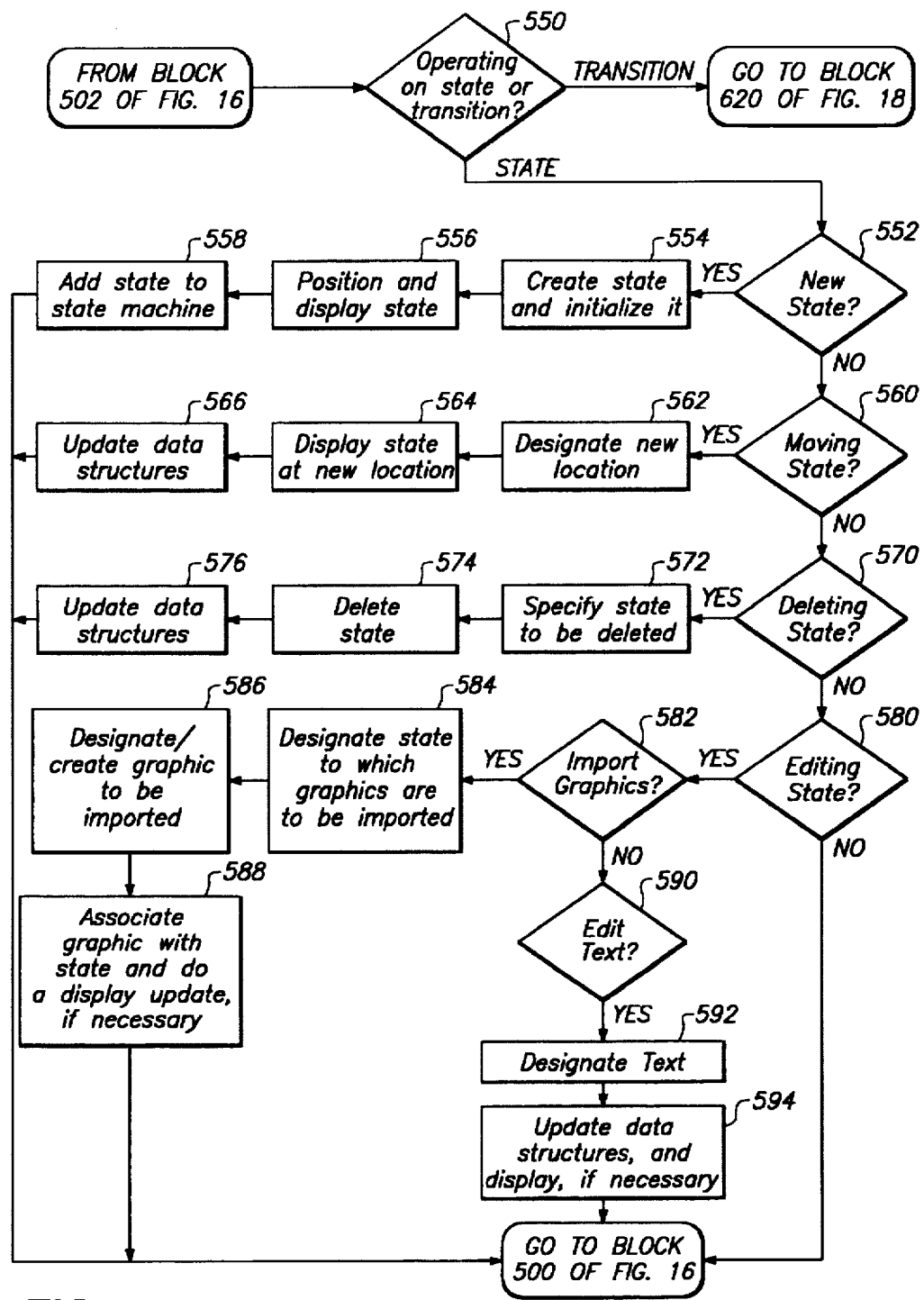

With reference to FIG. 17, at block 550 it is determined whether the event at block 500 of FIG. 16 pertains to an operation related to states or transitions. If the operation pertains to states, then control flows to block 552; otherwise, control flows to block 620 of FIG. 18.

At block 552, if the event at block 500 indicates the creation of a new state, then at block 554, the new state is created and initialized. This step typically entails creating an instance of the state data structure and initializing it. At block 556, the state is positioned and displayed in its full view in the author's view and user's view windows and its map representation in the map window. At block 558, the state is added to the state machine by updating the state machine data structures to include a reference to the new state. Control then flows back to block 500 of FIG. 16. Blocks 554, 556 and 558 can be performed in any order.

If at block 552, the event does not indicate the creation of a new state, then at block 560 it is determined whether the event indicates the relocation of a state. If so, then at block 562, a new location is designated, or otherwise determined. Depending on the implementation, a user may have already specified the new location. If so, that information is used and control flows directly to block 564. If not, then at this point, the user specifies the new location and control flows to block 564. At block 564 the state is displayed at its new location in the map window. At block 566 the state object is updated to specify the state's new location. Control then flows back to block 500 of FIG. 16. Blocks 564 and 566 can be performed in any order.

If at block 560 a state relocation operation is not specified, then at block 570 it is determined whether a delete state operation is specified. If so, then at block 572, unless the author has already indicated the state to be deleted, this information is determined, e.g. input by the user. At block 574, the specified state is deleted and at block 576, the data structures are updated accordingly. Typically, the state data structure is deleted and any transition or state machine data structures which reference the state are updated accordingly Control then flows back to block 500 of FIG. 16. Blocks 574 and 576 can be performed in any order.

If at block 570, it is determined that the event is not a state deletion operation, then at block 580 it is determined whether the event is an state editing operation. If so, control flows to block 582; otherwise, control flows back to block 500 of FIG. 16.

At block 582, if the event is an import graphic(s) operation then at block 584, unless already indicated, the state to which the graphic(s) are to be imported is specified. At block 586, the graphic(s) are created or designated and at block 588 the graphic(s) are associated with the specified state and the display is updated, if appropriate. Control then flows back to block 500 of FIG. 16. Blocks 586 and block 584 can be done in any order.

If at block 582, the event is not determined to be an import graphic(s) operation, then at block 590 it is determined whether the event is a text editing operation. If so, then at block 592, unless already indicated, the text is designated. Typically, the text being edited at block 592 is text associated with and being displayed with the map representation of a particular state. At block 594, the data structure storing or referencing the text is updated and the display in the map window is refreshed as needed. Control then flows back to block 500 of FIG. 16.

Figure 18:
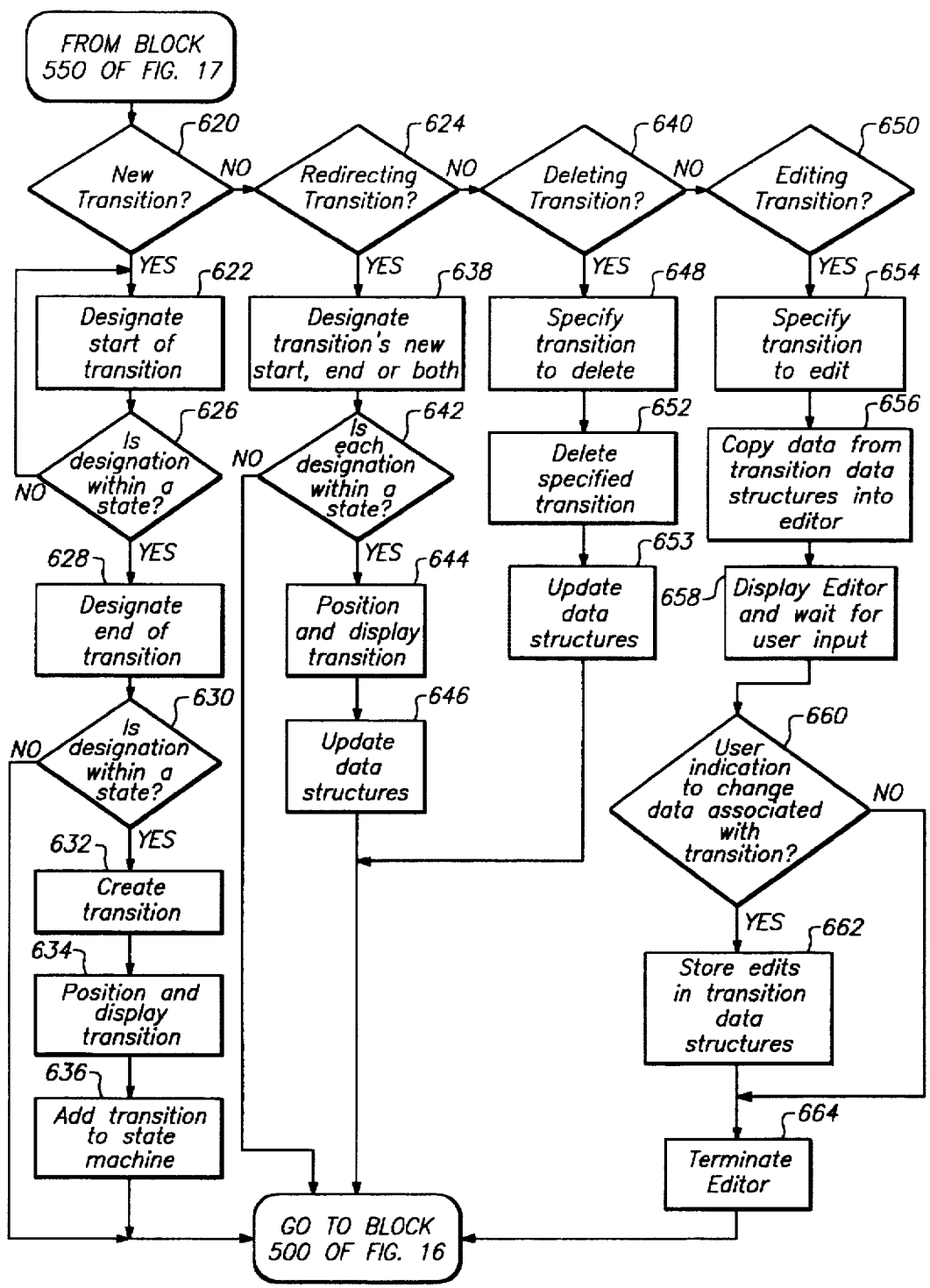

With reference to FIG. 18, at block 620 it is determined whether the event specifies a new transition. If so, then control flows to block 622; otherwise control flows to block 624. At block 622, the start of the transition is designated. This typically occurs when the user clicks on a location in the map window. If it is determined at block 626 that the location is within a state, i.e. it is within an area of the map window covered by the map representation of a state, then that state is designated as the from_state of the transition. Otherwise, control returns to block 622 so that the user can specify another location.

If at block 626 a from_state is specified, then at block 628 the end of the transition is specified. This typically occurs when the user releases the mouse button when the cursor is within the map representation of a state. If it is determined at block 630 that the cursor is within a state, then that state is designated as the to_state of the transition and control flows to block 632. Otherwise, control returns to block 500 of FIG. 16. Alternatively, rather than returning control to block 622, control can return to block 500 of FIG. 16.

At block 632 a transition is created and initialized, e.g. a transition data structure is set to specify the from_state and the to_state, and at block 634 the transition is positioned and displayed in the map window so that it lies between the from_state and the to_state and the direction indicators specify the appropriate flow of the transition. At block 636, the transition is added to the state machine, e.g. the state data structures of the from_state and to_state are updated to reference the transition. Blocks 632, 634 and 636 can be performed in any order.

At block 624, if the event indicates a transition redirection, then control flows to block 638; otherwise, control flows to block 640. A transition redirection is basically the changing of the to_state, the from_state or both of a transition. At block 638, the new start, end or both of the transition is specified. Typically, a user clicks on an end of a transition being displayed in the map window and drags the cursor to a new location within the map window. If at block 642, the new location is within a state, i.e. the cursor is within the map representation of a state, then control flows to block 644; otherwise, control flows back to block 500 of FIG. 16. At block 644 the transition is positioned and displayed in the new location and at block 646, the transition data structures are updated to reflect the changes in the from_state and/or to_state.

At block 640, if the event indicates a transition deleting operation, then control flows to block 648; otherwise, control flows to block 650. At block 648, the transition to be deleted is specified and at block 652 the transition is deleted. At block 653, data structures of any states or triggers referencing the deleted transition are updated to remove the references. Blocks 652 and 653 can be performed in any order.

At block 650, if the event indicates a transition editing operation, then control flows to block 654; otherwise, control flows to block 654. At block 654, the transition to be edited is specified, unless already indicated. At block 656, data is copied from the transition data structures into an editor and at block 658, the editor is displayed and prepared to receive user input. At block 660, if the user indicates a change in the data associated with the transition, then at block 662, the changes are stored in the transition data structures and at block 664 the editor is terminated.

The editor displayed at block 658 can be, for example, the transition information window 320 (FIG. 12). A variety of mechanisms can be used to allow a author to indicate whether to change the information. For example, "OK" and "CANCEL" buttons can be provided so that an author can select "OK" to indicate changes and "CANCEL" to exit the transition information window without having changes entered. In other implementations, the RETURN and ESCAPE keys can be used in place of the "OK" and "CANCEL" buttons, respectively.

In an alternative embodiment of the invention, changes are made as the author inputs them into the transition information window. In that case, whatever changes the user inputs are entered without further indication from the user and thus, block 658 can be omitted.

After blocks 636, 646, 653 and 664, control returns to block 500 of FIG.16.

Figure 19:
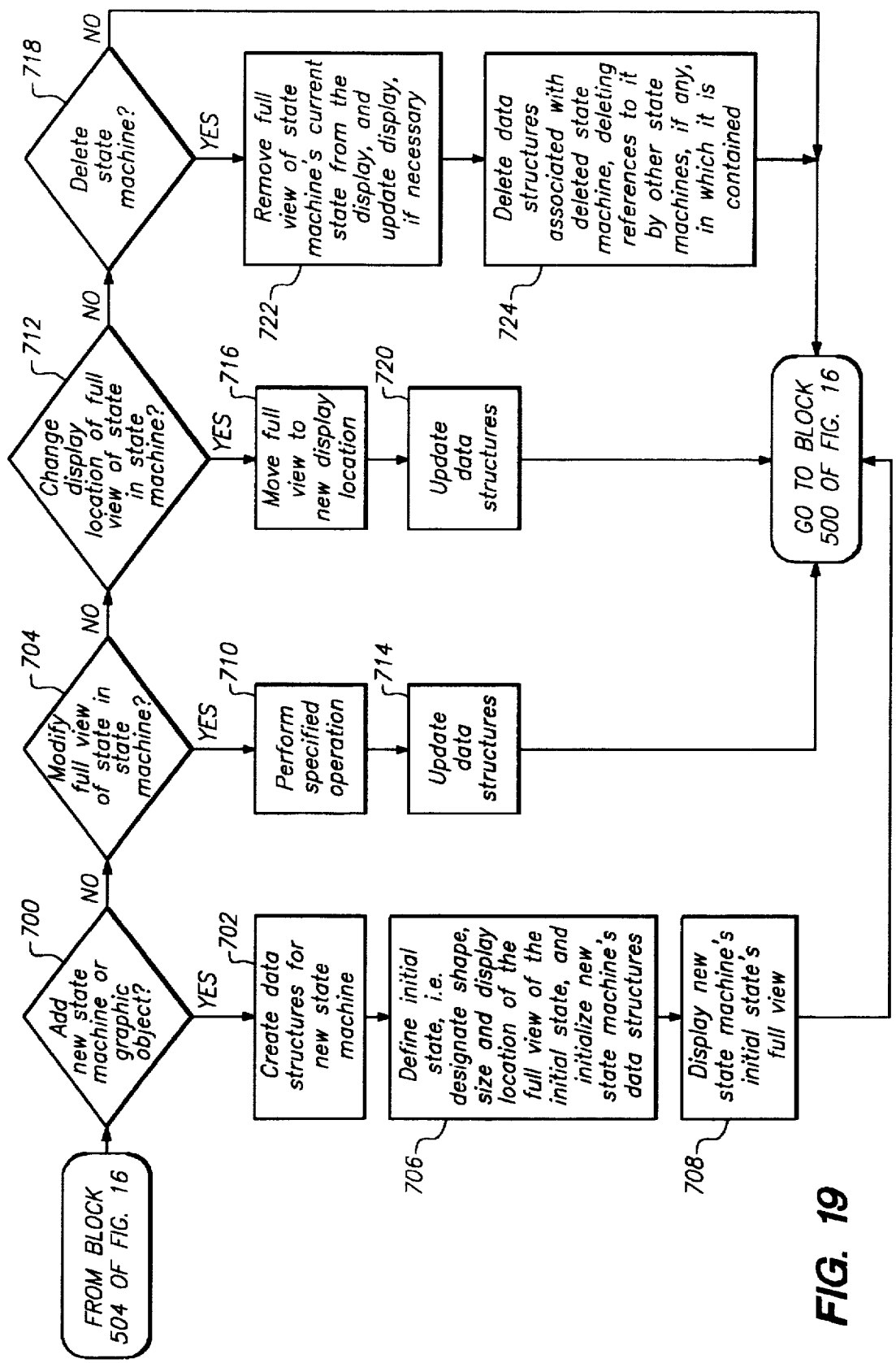

With reference to FIG. 19, at block 700 it is determined whether the event specifies an operation in which a new state machine or graphic object is being added. If so, control flows to block 700; otherwise control flows to block 704.

At block 702, data structures for the new state machine are created and at block 706 the initial state is defined and the new state machine's data structures are initialized. Information regarding the shape, size, and display location are designated by the user, if not already indicated. At block 708, the new state machine's initial state's full view is displayed in the author's view window and the user's view window. Control flows to block 500 of FIG. 16.

At block 704, it is determined whether the event specifies an operation in which a full view of a state or graphic object is being modified. If so, control flows to block 710; otherwise control flows to block 712. At block 710, the specified operation is performed. Examples of operations that may be specified include, but are not limited to, resizing, reshaping, coloring, and importing a graphic. At block 714, the data structures and/or objects are updated as appropriate. Blocks 710 and 714 can be performed in any order. Control flows to block 500 of FIG. 16.

At block 712, it is determined whether the event specifies an operation in which a display location of a full view of a state or graphic object is being changed. If so, control flows to block 716; otherwise control flows to block 718. At block 716, the full view is moved to the new display location. If the new display location or the full view is unspecified, then the user designates the information. At block 720, the data structures and/or objects are updated as appropriate. Control flows to block 500 of FIG. 16

At block 718, it is determined whether the event specifies a delete state machine or graphic object operation. If so, control flows to block 722; otherwise control flows to block 500 of FIG.16. At block 722, the full view of the state machine's current state is removed from the display in the author's view and user's view windows and the displays are refreshed, if appropriate. At block 724, the data structures associated with the deleted state machine are deleted. References to the deleted state machine are deleted from other state machine and/or state data structures. Blocks 722 and 724 can be performed in any order.

Although a preferred embodiment of the first aspect of the invention has been described with reference to an authoring tool for creating multimedia products, the invention can be incorporated in other types of software. Among other uses, the invention can be applied, for example, in software which simulates real-world devices. Nestable state machines can be used to represent device behavior. Additionally, the invention can be incorporated into a tool to provide a useful way of representing certain types of complex software.

In the second aspect of the invention, an authoring tool or other software tool which is based on a state machine architecture provides for the capturing and modification of transient events associated with transitions between states in a state machine. Preferably, the authoring tool has a state machine architecture incorporating the first aspect of the invention, previously described. However, the tool is equally applicable to other state machine architectures wherein a state machine comprises at least one state and zero or more transitions, each transition interconnecting a first state to a second state, wherein the first and second states can be the same or different states. Thus, although an embodiment of the second aspect is described below in terms of an authoring tool embodying the first aspect of the invention, it is equally applicable to authoring tools having other state machine architectures.

The term "capturing" is used herein to denote the action of obtaining a textual or graphic reference to a transient event, the reference capable of being used to manipulate the transient event.

Preferably, the user interface module 198 (FIG. 5) in conjunction with the transient event(s) module 204 (FIG. 5) provides a mechanism which allows a user to relatively easily capture and edit a transition in the multimedia product.

Figure 20:
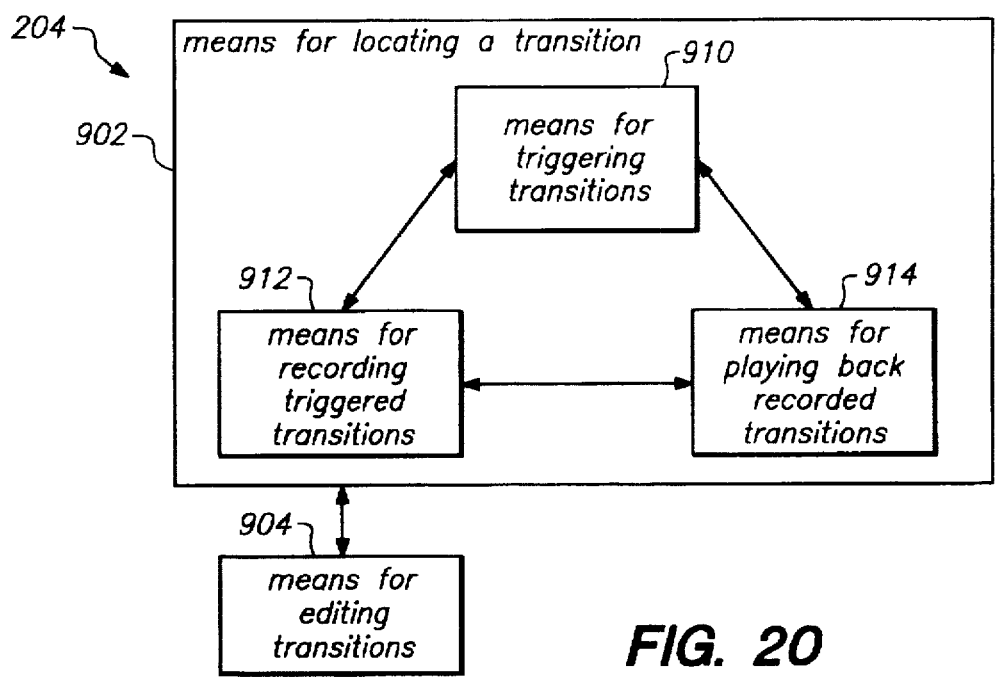
FIG. 20 generally depicts a block diagram representing a software architecture of the transient events module of FIG. 5.

As shown in FIG. 20, the transient event(s) module 204 of FIG. 5 comprises locating means 902 for locating a transition in the multimedia product and editing means 904 for editing the located transition, specifically, the transient event (s) associated with the located transition.

The locating means 902 comprises a triggering means 910, a transition recording means 912 and a transition playback means 914. The triggering means 910 triggers transitions in the multimedia product. For example, in a multimedia product embodying the first aspect of the invention, the triggering means 910 allows a user to trigger transitions by causing triggers to occur in the full view in the user's view window (FIG. 8).

The transition recording means 912 records the transitions which are triggered by the triggering means 910. The transitions are recorded in a manner that allows the transition playback means 914 to play back the recorded transitions in chronological order.

The editing means 904 generally provides a mechanism for editing the properties of a transition. Such properties include, but are not limited to, the transient event(s) associated with the transition and the triggers that cause the transition to occur.

The transition recording means 912 is preferably initiated upon execution of a multimedia product via the authoring tool incorporating the second aspect of the invention and remains operable until the execution of the multimedia product is terminated. Alternatively, an initiating mechanism and a halting mechanism are provided so that an author can selectively turn the transition recording means on and off. Such mechanisms can be for example menu items, buttons or tools in a tool palette.

While operable, the transition recording means 912 records transitions triggered in the user's view window. The transitions are recorded in a recorded transition list having zero or more recorded transition nodes, each recorded transition node containing data about a recorded transition. The recorded transition list is structured so that the chronological order of the occurrence of the recorded transitions is preserved or ascertainable. The chronological order can be explicitly specified in the data stored at each recorded transition node or it can be implicit in the structure of the recorded transition list, e.g. the ordering of the nodes in the list. When the chronological order is explicitly specified in each recorded transition, the recorded transitions list 914 can remain unsorted until playback.

Figure 21:
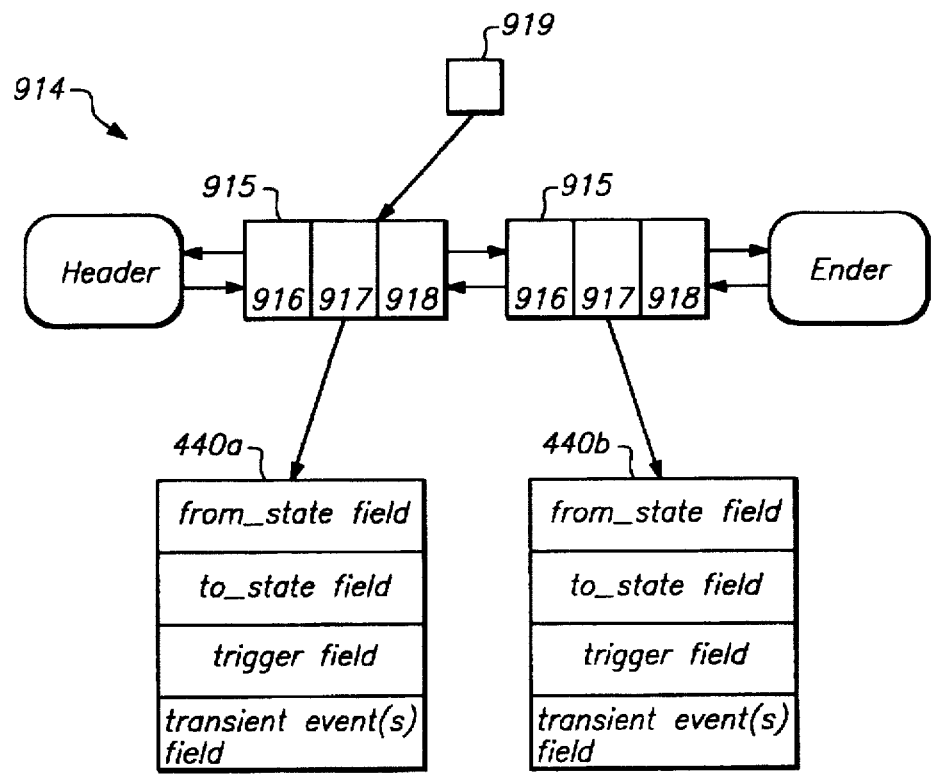
FIG. 21 shows an example of a recorded transitions list.

FIG. 21 shows a recorded transitions list 914 having a plurality of recorded transition nodes 915. In the example shown in FIG. 21, the chronological ordering of the recorded transitions is implicit in the ordering of the recorded transition nodes 915 in the recorded transitions list 914, i.e. the nodes are in chronological order. In this example, the recorded transitions list 914 is a doubly-linked list having a header and an ender and operating in a standard fashion as is well-known in the art. Each recorded transitions node 915 has previous node field 916, a transition identification field 917 and a next node field 918. The previous node field 916 and the next node field 918 specify the previous or next recorded transition node, respectively, in the recorded transitions list 914. The transition identification field 917 references, either directly or indirectly, a transition data structure 440, previously discussed with FIG. 14, associated with the transition being recorded.

Typically, a current location indication 919 is used for referencing a particular node within the recorded transitions list. The current location indication is typically used to traverse the recorded transitions list, specifying a current location, e.g. node, within the recorded transitions list.

In an embodiment of the invention, a separate area of the display screen such as a window is used to display a chart which is updated as transitions are triggered. The chart has two axes, one axis listing the types of transient events and another axis plotting time. When a transition is triggered, the chart is updated to show which transient events, if any, occurred. The categories of transient events is shown in FIG. 12 and the time aspect of the chart is shown in the scroll bar 932 of FIG. 22.

The transition playback means 914 plays back the recorded transitions by traversing the recorded transitions list 914. If the recorded transitions list 914 is unsorted, the transition playback means 914 sorts the list before playing back any of the recorded transitions.

Figure 22:
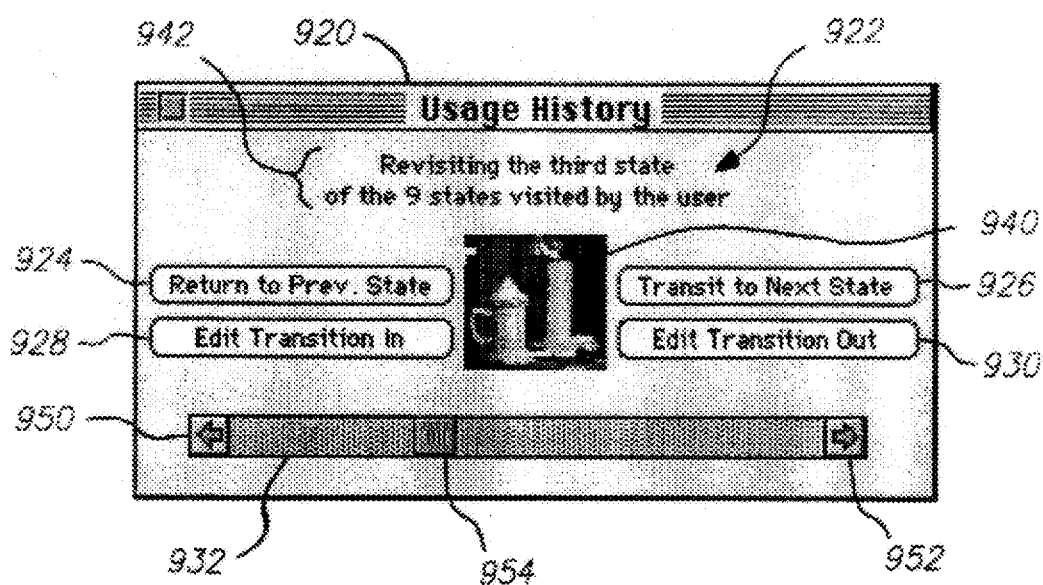
FIG. 22 illustrates a usage history window.

FIG. 22 shows a usage history window 920 which is displayed and acts as an interface between a user, the editing means 904 and the transition playback means 914. The usage history window 920 provides tools which allows a user to playback the recorded transitions in the user's view window and select a particular transition for editing.

In an embodiment of the invention, the usage history window 920 is displayed when the authoring tool enters author mode and remains displayed until author mode is exited. In an alternative embodiment, a toggle mechanism is provided to the user so that the user can selectively display or hide the usage history window 920. Examples of a toggle mechanism include, but are not limited to, a menu item or items, buttons, and tools in a tool palette.

The usage history window 920 comprises a state description area 922, a previous state tool 924 (represented herein by a button), a next state tool 926, an edit transition in tool 928 and an edit transition out tool 930. Optionally, the usage history window 920 further includes a scroll bar 932.

The state description area 922 displays a state which is either a from__state or a to__state of one of the recorded transitions and gives information on the number of states visited by the recorded transitions and the relative ordering of the state being displayed. Initially, the from__state of the first recorded transition is typically displayed in the current state area. The relationship of the state displayed in the state description area and the recorded transition node referenced by the current location indication 919 depends on the implementation of the invention. For example, the current location indication 919 may reference the state's incoming transition in some implementations and the state's outgoing transition in other implementations. A variety of other relationships can be implemented as well.

The state description area 922 contains a graphic view area 940 and a text description area 942. The graphic view area 940 displays a graphic representation, e.g. a map representation, of one of the states visited by the recorded transitions. For descriptive purposes, the state having its graphic representation displayed in the graphic view area 940 is called the "currently revisited state". For example, if a recorded transition goes from stateA to stateB, then those states are considered to be visited by that recorded transition.

The text description 942 typically specifies the number of states visited by the recorded transitions and the relative ordering of the state having its map representation displayed in the map view area 940. For example, if two transitions are recorded, the first transition going from stateA to stateB and the second transition going from state B to state C, then a total of three states are visited by those two recorded transactions.

The previous state tool 924 and the next state tool 926 allow a user to navigate through the recorded transitions, thereby directing the playback. The previous state tool 924 directs the playback in a backward or reverse chronological order, while the next state tool 926 directs the playback in a forward or chronological order. Typically, a user activates, e.g. clicks on, the previous state tool 924 to trigger a transition to the from__state of the active state and clicks on the next state tool 926 to trigger a transition to the to__state of the active state. The new state reached then becomes the currently revisited state and the state description area is updated accordingly.

Typically, each click advances a single state in the specified direction. In some implementations, the playback advances until the mouse button is released, thereby allowing the user to advance through a plurality of successive states.

The playback initiated by selection of the next state tool 926 typically triggers transitions in the user's view window. When the next state tool 926 is selected, the recorded transition between the currently revisited state and its to__state is played back in the user's view window. For tool 926 and, optionally, for tool 924, the playback of a transition includes the transient event(s) associated with the transition. For example, if a sound is associated with the transition, then the sound is played in substantially the same way as it would be played if triggered in the user's view window.

Depending on the implementation, selection of the previous state tool 924 may or may not playback a transition. In an embodiment of the invention, selection of the previous state tool 924 results in the from__state of the currently revisited state being designated as the currently revisited state, and although the user's view window display is updated to reflect the change in the currently revisited state, a transition is not played back. In an alternative embodiment, when the previous state tool 924 is selected, the recorded transition between the currently revisited state's from state and the currently revisited state is played back in the user's view window.

As the currently revisited state changes, the current location indication 919 (FIG. 21) is preferably updated accordingly.

The edit transition in tool 928 and the edit transition out tool 930 allow for the editing of the active state's incoming transition or outgoing transition, respectively. For descriptive purposes, the transition to be edited is called the "editable transition." In a situation where the currently revisited state has more than one incoming transition or outgoing transition, it is the recorded transition, i.e. the transition triggered by the user in the user's view window and recorded, which is the editable transition.

Selection of either tool 928 or 930 initiates an editor for editing the properties associated with the editable transition. In an authoring tool incorporating the first aspect of the invention, this editor is transition editing means 224 (FIG. 6) and a transition information window 320 (FIG. 12) is displayed for the user. The properties associated with the editable transition are passed to the editing means 224 and displayed as appropriate in the transition information window 320. The transiton information window 320 operates as previously discussed in conjunction with FIGS. 12 and 13.

The scroll bar 932 is a standard scroll bar such as that used in the Finder of the Apple System 7 operating system. The operation of such scroll bars are well known in the art. The scroll bar 932 can be used to advance in a forward or backward fashion through the recorded transitions and the visited states. The arrows 950 and 952 advance the visited states backward and forward, respectively, one state at a time, while the thumb 954 advances a plurality of successive states in the direction of movement of the thumb. The arrows 950 and 952 can be implemented in a similar manner as the previous state tool 924 and the next state tool 926, respectively. The implementation of the scroll bar thumb is then a function of those implementations.

Figure 23:
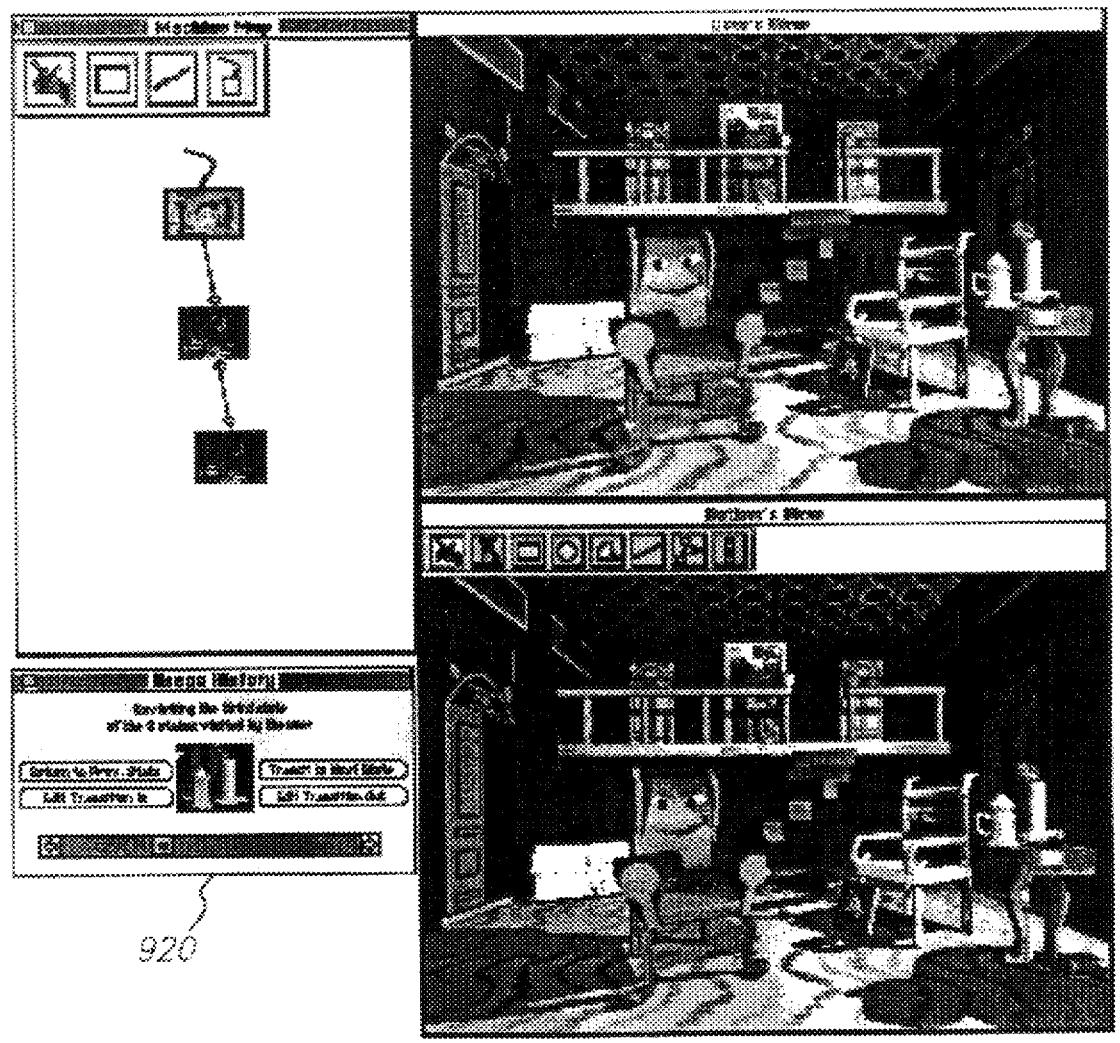
FIG. 23 illustrates the display of a usage history window in an authoring tool embodying both the first and second aspects of the invention.

FIG. 23 illustrates the display provided by an authoring tool incorporating both the first and second aspect of the invention.

Figure 24:
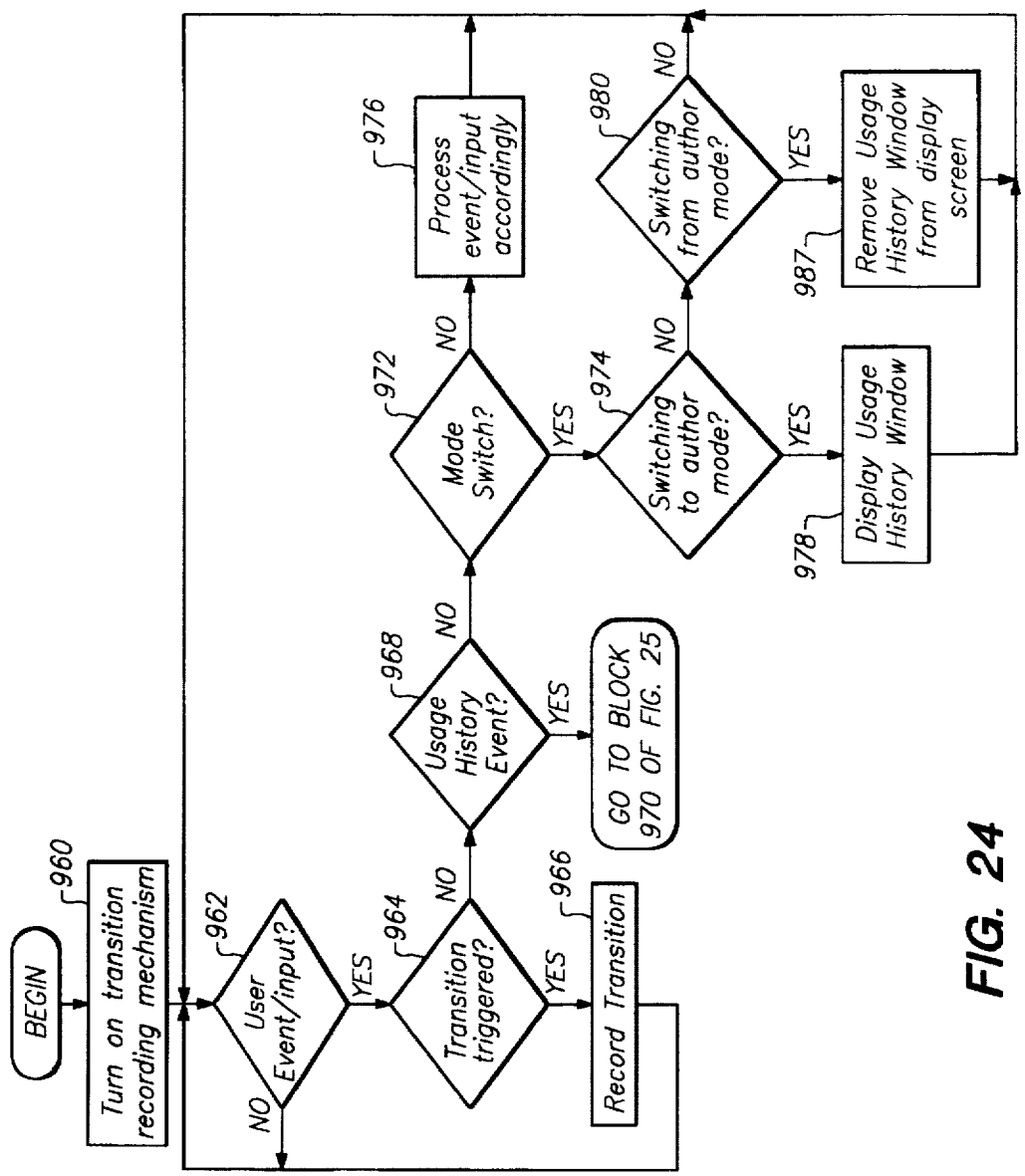
FIGS. 24–25 are flow charts generally depicting the steps performed in the operation of an authoring tool incorporating the second aspect of the invention.

In operation, FIG. 24 is a flowchart generally depicting the steps performed by the transient event(s) module 204 in an embodiment incorporating the first and second aspects of the invention and in which the transition recording means is initiated upon execution of a multimedia product from within the authoring tool and the usage history window is displayed as long as the authoring tool is in author mode.

At block 960, the transition recording mechanism is turned on and prepared to begin recording transitions. The recorded transactions list is created and initialized. At block 962, it is determined whether there is a user event or input. Control remains at block 962 until an event occurs or input is otherwise received. After it is determined that there is an event or user input, then at block 964 it is determined whether the event or user input indicates that a transition has been triggered. If so, the triggered transition is recorded at block 966; otherwise control flows to block 968.

A triggered transition is typically recorded by creating a recorded transition node, setting the node, e.g. the transition identification field within the node, to reference the transition data structure of the triggered transition, and, optionally, other data, and adding the recorded transition node to the recorded actions list. If the ordering of the nodes is explicit, then the chronological ordering is also stored, e.g. a counter value is stored and then incremented or the current date and time is stored.

At block 968, it is determined whether the event or input indicates a usage history event. If so, then control flows to block 970 of FIG. 25; otherwise, at block 972 it is determined whether the event or input indicates a mode switch, e.g. author to user or vice versa. If so, then control flows to block 974; otherwise, control flows to block 976.

At block 974 it is determined whether the event or input indicates a switch to author mode. If so, then at block 978, the usage history window is displayed. If not, then at block 980, it is determined whether the event or input indicates a switch from author mode. If so, then at block 982, the usage history window is removed from the screen display. If not, then control flows to block 976.

At block 976, the event or input is processed accordingly as it would be in an authoring tool which does not embody the invention. Control then flows back to block 962.

Figure 25:
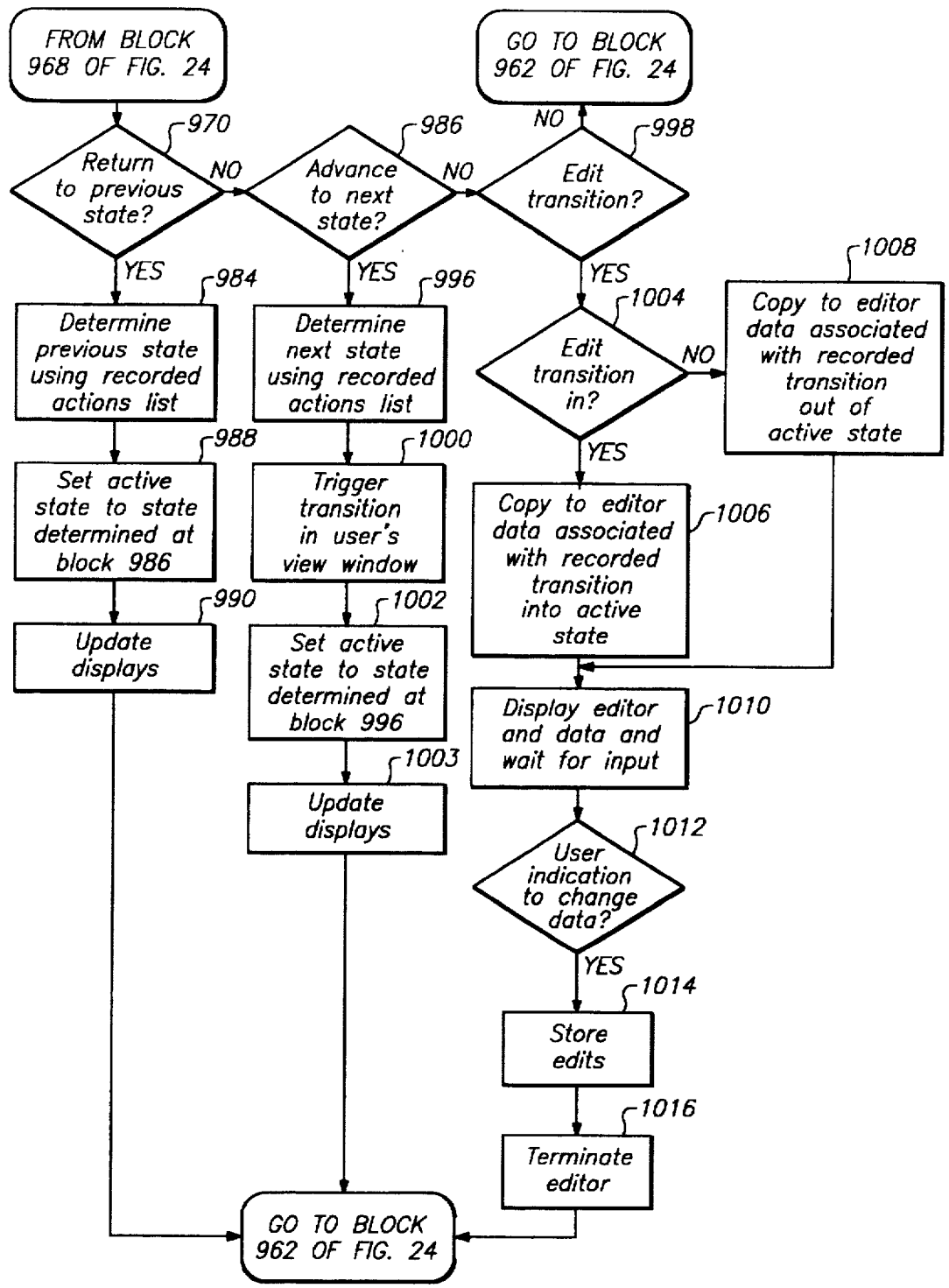

With reference to FIG. 25, at block 970 it is determined whether the event or input indicates a change from the currently revisited state to a previous state. If so, then control flows to block 984; otherwise control flows to block 986. At block 984, the recorded actions list is used to determine the state which immediately chronologically precedes the currently revisited state. This is typically determined by examining the from_state field of the transition data structure associated with the transition referenced by the recorded transition node identified by the current location indication. The state determined at block 984 is made the currently revisited state at block 988. At block 990, the displays in the user's view window, the map view area of the usage history window and the text description in the usage history window are updated to reflect the new currently revisited state. Control then returns to block 962 of FIG. 24. Blocks 970, 986 and 998 can be performed in any order.

At block 986 it is determined whether the event or input indicates a change from the currently revisited state to a next state. If so, then control flows to block 996; otherwise control flows to block 998. At block 996 the recorded actions list is used to determine the state which immediately chronologically follows the currently revisited state. This is typically determined by examining the to_state field of the transition data structure associated with the transition referenced by the recorded transition node identified by the current location indication. At block 1000, the transition referenced by the recorded transition node identified by the current location indication is triggered in the user's view window. The state determined at block 996 is made the currently revisited state at block 1002. Then at block 1003, the displays in the user's view window, the map view area of the usage history window and the text description in the usage history window are updated to reflect the new currently revisited state. Control then returns to block 962 of FIG. 24.

At block 988 it is determined whether the event or input indicates an edit of a transition. If so, then control flows to block 1004; otherwise control flows to block 962 of FIG. 24. At block 1004 it is determined whether the edit operation refers to an incoming transition of the currently revisited state. If so, then control flows to block 1006; otherwise control flows to block 1008. At block 1006, data associated with the recorded incoming transition of the currently revisited state is copied to an editor. At block 1008, data associated with the recorded outgoing transition of the currently revisited state is copied to an editor. This data is located in the transition data structure. The transition from which data is copied is called the editable transition.

After the data is copied to editor at either block 1006 or 1008, at block 1010 the editor and data are displayed and the editor waits for input. If at block 1012, the input indicates a change to the data associated with the editable transition then the changes are stored in the transition data structure associated with the editable transition at block 1014 and the editor is terminated at block 1016. Control then returns to block 962 of FIG. 24.

Thus, to capture a particular transient event, an author can perform the following steps. The author triggers transitions in the user's view window until the particular transient event occurs. The author then uses the usage history window to capture the transient event as follows. The author uses the previous state tool and the next state tool until the map view area displays a state which is either a from_state or a to_state of a transition with which the particular transient event is associated, herein called "the transition". The author then uses the edit transion in tool and edit transition out tool to initiate editing of the transition. The actual tool selected depends on whether the state in the map view area is the from_state or the to_state of the transition to be edited. The transient event(s) associated with the transition are then displayed by the editor. The author can capture the particular transient event by manipulating the editor's display. For example, a user can select the displayed object representing transient event (see FIG. 12) and copy the object to a new location or move it to another transition, thereby capturing the transient event for later use.

The invention provides an author with a graphic reference of a transient event in the context in which the transient event occurs. Since the author experiences the transient event in the context in which it occurred, the author has information about the effect, use and properties of the transient event. The invention allows an author to easily locate the transient event in a software title by replaying the transitions leading to the transient event. Once a transient event is located, it is easily captured in a manner that provides a graphic reference to the transient event. The reference allows an author to easily manipulate the transient event. An author can use the reference to quickly access the transient event at a later time.

The foregoing description has been limited to a specific embodiment of this invention. It will be apparent, however, that variations and modifications may be made to the invention with the attainment of some or all of its advantages. Therefore, it is the object of the appended claims to cover all such variations and modifications as come within the true spirit and scope of the invention.

We claim:

1. An apparatus for authoring nested graphic state machines, wherein said apparatus has a processor and at least one storage medium, said apparatus comprising:

a state machine module for creating a plurality of nested graphic state machines, each graphic state machine representing one or more states of an arbitrary graphic object, wherein at least a portion of said state machine module is stored in said at least one storage medium, and wherein each state machine has one or more arbitrarily arranged states and one or more transitions with each transition interconnecting a first state to a second state, and wherein each state machine has a full view associated to it and each state has a full view associated to it thereby allowing said state machine module to create at least one sub-state machine within a first state machine by containing the full view of the second state machine within the full view of the first state machine; and a user interface module capable of interacting with said state machine module, wherein said user interface module displays a full view of a state machine and receives user input, wherein said user input can activate a sub-state machine nested within the full view of the state machine being displayed, and wherein said activating causes a full view of the state within the activated sub-state machine to be displayed.

2. An apparatus as defined in claim 1 wherein a first state and a second state are the same state so that a transition connecting the first state and the second state interconnects a state to itself and wherein the arbitrary graphic object is a multimedia product.

3. An apparatus for authoring nested graphic state machines, wherein a graphic state machine represents one or more states of an arbitrary graphic object, wherein said apparatus has a processor and at least one storage medium, said apparatus comprising:

a state machine module for creating a plurality of nested graphic state machines, wherein at least a portion of said state machine module is stored in said at least one storage medium, and wherein each state machine has one or more arbitrarily arranged states and one or more transitions with each transition interconnecting a first state to a second state, and wherein each state machine has a full view associated to it and each state has a full view associated to it thereby allowing said state machine module to create at least one sub-state machine within a first state machine by containing the full view of the second state machine within the full view of the first state machine; and a user interface module capable of interacting with said state machine module, wherein said user interface module displays a full view of a state machine and receives user input, wherein said user input can activate a sub-state machine nested within the full view of the state machine being displayed, and wherein said activating causes a full view of the state within the activated sub-state machine to be displayed; wherein the user interface module further displays a user interface having:

a state machine map view comprising graphic representations of each state included in a state machine;

a separate and distinct user's view, displayed simultaneously with said state machine map, said user's view displaying a state machine as it would appear to a user when the nested state machine being authored is executed in a computer system, wherein when an object in the user's view window is activated the result is substantially the same as the result that would occur when the nested state machine being authored is executed separately from the authoring apparatus in a computer system; and a separate author's view, displayed simultaneously with said state machine map, said author's view displaying a state machine corresponding to the state machine displayed in the user's window, wherein when an object in the author's view window is activated the activating results in selecting the object so that it can be manipulated without causing the result that would occur when the nested state machine being authored is executed in a computer system.

4. An apparatus for authoring nested graphic state machines, said apparatus having a processor and at least one storage medium, said apparatus comprising:

at least one nested graphic state machine, each graphic state machine representing one or more states of an arbitrary graphic object, said state machine having one or more states and one or more transitions associated therewith, wherein each transition interconnects a first state to a second state, wherein the first state and the second state are the same or different states and can be arbitrarily arranged, and wherein each transition has an associated trigger whereby an occurrence of a trigger causes a transition from the first state to the second state;

state machine creation means for creating said at least one nested graphic state machine;

state machine deletion means for deleting said at least one nested graphic state machine;

state machine editing means for editing said at least one nested graphic state machine;

state machine nesting means for nesting a first state machine within a second state machine;

state machine creation means for creating a state within a state machine, said state creation means adding said created state to the state machine;

state deletion means for deleting a state within a state machine;

transition creation means for creating a transition between a first and a second state machine, said transition creation means adding said created transition to the state machine;

transition deleting means for deleting a transition from a state machine;

transition editing means for editing a transition in a state machine; and display means for displaying a graphic representation of a state machine.

5. An apparatus as defined in claim 4 wherein said display means simultaneously displays a full view of a state in the state machine and a map of the state machine, the map containing a map representation of each state in the state machine, the full view and the map representation being displayed as separate and distinct views.

6. An apparatus for authoring nested graphic state machines, wherein a graphic state machine represents one or more states of an arbitrary graphic object, said apparatus having a processor and at least one storage medium, said apparatus comprising:

at least one nested graphic state machine, said state machine having one or more states and one or more transitions associated therewith, wherein each transition interconnects a first state to a second state, wherein the first state and the second state are the same or different states and can be arbitrarily arranged, and wherein each transition has an associated trigger whereby an occurrence of a trigger causes a transition from the first state to the second state;

state machine creation means for creating said at least one nested graphic state machine;

state machine deletion means for deleting said at least one nested graphic state machine;

state machine editing means for editing said at least one nested graphic state machine;

state machine nesting means for nesting a first state machine within a second state machine;

state machine creation means for creating a state within a state machine, said state creation means adding said created state to the state machine;

state deletion means for deleting a state within a state machine;

transition creation means for creating a transition between a first and a second state machine, said transition creation means adding said created transition to the state machine;

transition deleting means for deleting a transition from a state machine;

transition editing means for editing a transition in a state machine; and display means for displaying a graphic representation of a state machine, the display means simultaneously displaying a full view of a state in the state machine and a map of the state machine, the map containing a map representation of each state in the state machine, the full view and the map representation being displayed as separate and distinct views; wherein said apparatus has at least a user mode and an author mode such that a full view of a state in the state machine and a map of the state machine are simultaneously displayed only when said apparatus is in said author mode.

7. An apparatus as defined in claim 6 wherein the display of the full view of a state in the state machine in author mode is displayed in a first window and a second window, and wherein user actions in said first window trigger transitions to occur and user actions in said second window cause the content within the second window to be edited.

8. An apparatus for authoring nested graphic state machines, wherein a graphic state machine represents one or more states of an arbitrary graphic object, said apparatus having a processor and at least one storage medium, said apparatus comprising:

at least one nested graphic state machine, said state machine having one or more states and one or more transitions associated therewith, wherein each transition interconnects a first state to a second state, wherein the first state and the second state are the same or different states and can be arbitrarily arranged, and wherein each transition has an associated trigger whereby an occurrence of a trigger causes a transition from the first state to the second state;

state machine creation means for creating said at least one nested graphic state machine;

state machine deletion means for deleting said at least one nested graphic state machine;

state machine editing means for editing said at least one nested graphic state machine;

state machine nesting means for nesting a first state machine within a second state machine;

state machine creation means for creating a state within a state machine, said state creation means adding said created state to the state machine;

state deletion means for deleting a state within a state machine;

transition creation means for creating a transition between a first and a second state machine, said transition creation means adding said created transition to the state machine;

transition deleting means for deleting a transition from a state machine;

transition editing means for editing a transition in a state machine; and display means for displaying a graphic representation of a state machine; wherein said apparatus has at least an author mode and a user mode, such that when said apparatus is in said author mode the contents of the state machine can be edited and transitions can be triggered, said apparatus further comprising:

user interface means for receiving user input; and mode selecting means for selectively switching between modes, said mode selecting means switching modes in response to user input received from said user interface means.

9. A method for nesting a second graphic state machine within a first graphic state machine, the first and second graphic state machines being displayed on a computer system having a processor and at least one storage medium, said method comprising the steps of:

defining a first state machine and a second state machine, each state machine having a full view, each of the first state machine and the second state machine representing one or more states of an arbitrary graphic object;

defining one or more states for each state machine, each state having a full view, wherein each state can reference one or more state machines; and providing in a state of the first state machine a reference to the second state machine, wherein the full view of the second state machine is contained within the full view of the first state machine.

10. An apparatus for authoring at least one nested graphic state machine, wherein each state machine has one or more states and one or more transitions associated therewith, said apparatus comprising a processor and at least one storage medium for storing at least one state machine data structure, each state machine data structure of said at least one state machine data structure corresponding to a state machine and comprising:

a states field, said states field arranged to reference the one or more states in the corresponding graphic state machine, each state machine represents one or more state of an arbitrary graphic object;

a transitions field, said transitions field referencing the one or more transitions in the corresponding state machine;

an initial state field specifying a starting state of the state machine; and a current state field specifying a state in which the state machine is currently being displayed in the user's vie window.

11. The apparatus of claim 10, further comprising a transition data structure for each transition specified by said transitions field, wherein said transition data structure comprises:

a from state field for specifying the state from which the transition is originating;

a to state field for specifying the state to which the transition is being made; and a trigger identification field for specifying a trigger for the transition.

12. The apparatus of claim 11, further comprising for each transition having at least one associated transient event, a transient events field for indicating which transient events, if any, should occur during the transition from the state specified by the from state field to the state specified by the to state field of the corresponding transition data structure.

13. A method for authoring at least one nested graphic state machine on a computer system, the computer system having a processor and a storage medium, wherein each state machine has one or more states and one or more transitions associated therewith, said method comprising the computer implemented steps of:

determining whether a state of the at least one graphic state machine is to operated on, the at least one graphic state machine representing one or more states of an arbitrary graphic object;

determining whether a transition is to be operated on;

determining whether a state machine is to be operated on;

if a state is to be operated on, determining the operation to be performed and performing the operation accordingly;

if a transition is to be operated on, determining the operation to be performed and performing the operation accordingly; and if a state machine is to be operated on, determining the operation to be performed and performing the operation accordingly.

14. The method of claim 13, wherein there are at least four operations that can be performed on a state, said four operations comprising:

creating a new state;

moving a state;

deleting a state; and editing a state.

15. The method of claim 14, wherein the step of creating a new state comprises the steps of:

initializing the new state;

positioning the new state;

displaying the new state; and adding the new state to at least one state machine.

16. The method of claim 14, wherein the step of moving a state comprises the steps of:

designating a new location for the state to be moved;

displaying the state at its new location; and updating an entry in a data structure with data that identifies the new location for the state.

17. The method of claim 14, wherein the step of deleting a state comprises the steps of:

designating the state to be deleted; and updating a data structure indicating the state has been deleted.

18. The method of claim 13, wherein there are at least four operations that can be performed on a transition, said four operations comprising:

creating a new transition;

redirecting a transition;

deleting a transition; and editing a transition.

19. The method of claim 18, wherein the step of creating a new transition comprises the steps of:

designating the starting state of the new transition;

designating the ending state of the new transition;

positioning the new transition;

updating an entry in a data structure to indicate the new transition has been created.

20. The method of claim 18, wherein the step of redirecting a transition comprises the steps of:

designating a new location for the transition;

positioning the new transition at its new location; and updating an entry in a data structure to indicate the new location for the transition.

21. The method of claim 18, wherein the step of deleting a transition comprises the steps of:

designating the transition to be deleted;

deleting the transition; and updating a data structure to indicate the transition has been deleted.

22. The method of claim 18, wherein the step of editing a transition comprises the steps of:

specifying the transition to be edited;

copying the transition data into an editor;

editing the transition data; and storing the edited transition data in a data structure.

23. The method of claim 13, wherein there are at least four operations that can be performed on a state machine, said four operations comprising:

creating a new state machine;

modifying a full view of a state in a state machine;

deleting a state machine; and changing a display location of a full view of a state in a state machine.

24. The method of claim 23, wherein the step of creating a new state machine comprises the steps of:

creating a new data structure for the new state machine;

defining an initial state for the new state machine;

initializing the new state machine; and displaying a full view of the initial state.

25. The method of claim 23, wherein the step of modifying a full view of a state in a state machine comprises the steps of:

receiving at least one modification to be performed; and updating a data structure to indicate the at least one modification.

26. The method of claim 23, wherein the step of deleting a state machine comprises the steps of:

removing a full view of a current view in the state machine from the display;

deleting a data structure associated with the state machine; and if the deleted state machine is referenced in other data structures, deleting references to the deleted state machine in other data structures.

27. The method of claim 23, wherein the step of changing a display location of a full view of a state in a state machine comprises the steps of:

moving the full view of the state in the state machine to a new display location; and updating a data structure to indicate the new display location of the full view of the state in the state machine.

28. A method for authoring at least one nested graphic state machine on a computer system, wherein a graphic state machine represents one or more states of an arbitrary graphic object, the computer system having a processor and a storage medium, wherein each state machine has one or more states and one or more transitions associated therewith, said method comprising the computer implemented steps of:

determining whether a state is to operated on;

determining whether a transition is to be operated on;

determining whether a state machine is to be operated on;

if a state is to be operated on, determining the operation to be performed and performing the operation accordingly, wherein at least four operations can be performed on a state, the four operations including:

creating a new state; moving a state;
deleting a state; and
editing a state;
if a transition is to be operated on, determining the operation to be performed and performing the operation accordingly; and
if a state machine is to be operated on, determining the operation to be performed and performing the operation accordingly, wherein the step of editing a state comprises the steps of:
   determining whether graphics are to be imported into the state or whether text within the state is to be edited;
   if graphics are to be imported, then:
      designating the graphics to be imported; and
      associated the graphics with the state;
   if text within the state is to be edited, then:
      designating the text to be edited; and
      updating an entry in a data structure identifying the edited text.

29. An apparatus for authoring multimedia having nested graphic state machines, wherein said apparatus has a processor and at least one storage medium, said apparatus comprising;
   a state machine module for creating a plurality of nested graphic state machines in multimedia, each graphic state machine representing one or more states of an arbitrary graphic object, wherein at least a portion of said state machine module is stored in said at least one storage medium, and where each state machine has one or more arbitrarily arranged states and one or more transitions with each transition interconnecting a first state to a second state, and wherein each state machine has a full view associated to it and each state has a full view associated to it thereby allowing said state machine module to create at least one sub-state machine by nesting a second state machine within a first state machine by containing the full view of the second state machine within the full view of the first state machine; and
   a user interface module capable of interacting with said state machine module, wherein state user interface module displays a full view of a state machine and receives user input, wherein said user input can activate a sub-state machine nested within the full view of the state machine being displayed, and wherein said activating causes a full view of a state within the activated substate machine to be displayed.

30. An apparatus for authoring multimedia having nested graphic state machines, said apparatus having a processor and at least one storage medium, said apparatus comprising:
   at least one nested graphic state machine in the multimedia, the at least one graphic state machine representing one or more states of an arbitrary graphic object, said state machine having one or more states and one or more transitions associated therewith, wherein each transition interconnects a first state to a second state, where the first state and the second state are the same or different states and can be arbitrarily arranged, and wherein each transition has an associated trigger whereby an occurrence of a trigger causes a transition from the first state to the second state;
   state machine creation means for creating said at least one nested graphic state machine;
   state machine deletion means for deleting said at least one nested graphic state machine;
   state machine editing means for editing said at least one nested graphic state machine;
   state machine nesting means for nesting a first state machine within a second state machine;
   state machine creation means for creating a state within a state machine, said state creation means adding said created state to the state machine;
   state deletion means for deleting a state from a state machine;
   state editing means for editing a state within a state machine;
   transition creation means for creating a transition between a first and a second state in a state machine, said transition creation means adding said created transition to the state machine;
   transition deleting means for deleting a transition from a state machine;
   transition editing means for editing a transition in a state machine; and
   display means for displaying a graphic representation of a state machine.

31. A method for nesting a second graphic state machine within a first graphic state machine in multimedia, the first and second graphic state machines being displayed on a computer system having a processor and at least one storage medium, said method comprising the steps of:
   defining a first state machine and a second state machine in multimedia, each state machine having a full view, each of the first and second graphic state machines representing one or more states of an arbitrary graphic object;
   defining one or more states for each state machine, each state having a full view, wherein each state can reference one or more state machines; and
   providing in a state of the first state machine a reference to the second state machine, wherein the full view of the second state machine is contained within the full view of the first state machine.

32. A method for authoring multimedia having at least one nested graphic state machine on a computer system, the computer system having a processor and a storage medium, wherein each state machine has one or more states and one or more transitions associated therewith, said method comprising the computer-implemented steps of:
   determining whether a state of the at least one nested graphic state machine is to be operated on, the at least one graphic state machine representing one or more states of an arbitrary graphic object;
   determining whether a transition is to operated on;
   determining whether a state machine is to be operated on;
   if a state is to be operated on, determining the operation to be performed and performing the operation accordingly;
   if a transition is to be operated on, determining the operation to be performed and performing the operation accordingly; and
   if a state machine is to be operated on, determining the operation to be performed and performing the operation accordingly.

33. A computer-readable medium having stored thereon a state machine data structure for use in authoring at least on nested graphic state machine, wherein each state machine has one or more states and one or more transitions associated therewith, said state machine data structure comprising:

a states field, said states field arranged to reference the one or more states in the corresponding state machine, the at least one graphic state machine representing one or more states of an arbitrary graphic object;

a transitions field, said transitions field referencing the one or more transitions in the corresponding state machine;

an initial state field specifying a starting state of the state machine; and a current state field specifying a state in which the state machine is currently being displayed in the user's view window.

34. The computer-readable medium of claim 33, further comprising a transition data structure for each transition specified by said transitions field, wherein said transition data structure comprises:

a from_state field for specifying the state from which the transition is originating;

a to_state field for specifying the state to which the transition is being made; and a trigger identification field for specifying a trigger for the transition.

35. The computer-readable medium of claim 34, further comprising for each transition having at least one associated transient event, a transient events field for indicating which transient events, if any, should occur during the transition from the state specified by the from_state field to the state specified by the to_state field of the corresponding transition data structure.

36. A method for authoring nested graphic state machines in a computer system having a processor connected to a storage medium, each graphic state machine referencing one or more states of an arbitrary graphic object, said method comprising the steps of:

displaying a map view containing a graphical display of each state of a graphical state machine and indicating transitions among said each state; and displaying a separate and distinct user's view and a separate and distinct author's view, wherein said user's view and author's view are displayed simultaneously, wherein said user's view and author's view display a same state of the graphical state machine and wherein user input in said user's view triggers transitions in the graphical state machine, while user input in said author's view causes the displayed same state to be edited and wherein said user's view and author's view are synchronized such that as the display changes in said author's view, said user's view is updated to reflect the changes.

37. The method as defined in claim 36, wherein said nested graphic state machines are contained in multimedia.

38. A computer-readable medium having stored thereon instructions for causing a computer system to perform the following steps:

displaying a map view containing a graphical display of each state of a graphical state machine and indicating transitions among said each state, each graphical state machine representing one or more states of an arbitrary graphical object; and displaying a separate and distinct user's view and a separate and distinct author's view, wherein said user's view and author's view are displayed simultaneously, wherein said user's view and author's view display a same state of the graphical state machine and wherein user input in said user's view triggers transitions in the graphical state machine, while user input in said author's view causes the displayed same state to be edited and wherein said user's view and author's view are synchronized such that as the display changes in said author's view, said user's view is updated to reflect the changes.

39. The computer-readable medium of claim 38, wherein said nested graphic state machines are contained in multimedia.

40. An apparatus for authoring a graphic state machine, wherein said apparatus has a processor and at least one storage medium, said apparatus comprising:

a state machine module for creating the graphic state machine representing one or more states of an arbitrary graphic object, at least a portion of said state machine module being stored in the at least one storage medium, and wherein each state machine has one or more arbitrarily arranged states and one or more transitions with each transition interconnecting a first state to a second state; and a user interface module capable of interacting with said state machine module, the user interface module capable of displaying a full view of a state machine and receiving user input, the user interface module further displaying a user interface capable of having:

a separate and distinct user's view, displayed simultaneously with said state machine map, said user's view displaying a state machine as it would appear to a user when the nested state machine being authored is executed in a computer system, wherein when an object in the user's view window is activated the result is substantially the same as the result that would occur when the nested state machine being authored is executed separately from the authoring apparatus in a computer system; and a separate author's view, displayed simultaneously with said state machine map, said author's view displaying a state machine corresponding to the state machine displayed in the user's window, wherein when an object in the author's view window is activated the activating results in selecting the object so that it can be manipulated without causing the result that would occur when the state machine being authored is executed in a computer system.

41. The apparatus of claim 40 wherein the user interface is further capable of having a state machine map view comprising graphic representations of each state included in a state machine.

* * * * *